(12) United States Patent
Ise

(10) Patent No.: US 10,691,012 B2
(45) Date of Patent: Jun. 23, 2020

(54) IMAGE CAPTURING APPARATUS, METHOD OF CONTROLLING IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventor: Yasuaki Ise, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/407,586

(22) Filed: May 9, 2019

(65) Prior Publication Data

US 2019/0354003 A1 Nov. 21, 2019

(30) Foreign Application Priority Data

May 16, 2018 (JP) .................. 2018-094758

(51) Int. Cl.
| | |
|---|---|
| *H04N 7/18* | (2006.01) |
| *H04N 13/00* | (2018.01) |
| *H04N 5/225* | (2006.01) |
| *G03B 37/04* | (2006.01) |
| *H04N 5/232* | (2006.01) |
| *G06T 3/40* | (2006.01) |
| *G06T 1/00* | (2006.01) |

(52) U.S. Cl.
CPC ............ *G03B 37/04* (2013.01); *G06T 1/0007* (2013.01); *G06T 3/40* (2013.01); *H04N 5/2258* (2013.01); *H04N 5/23229* (2013.01); *H04N 5/23238* (2013.01)

(58) Field of Classification Search
CPC .............. H04N 5/232; H04N 5/23238; H04N 5/23229; H04N 5/272; H04N 7/18; H04N 7/181; H04N 13/239; H04N 5/2258; H04N 5/265; H04N 5/2628; H04N 5/262; G06T 3/40; G06T 1/0007; G03B 37/04
USPC .............. 348/36, 38, 47, 48, 159, 169, 172, 348/207.99, 208.14, 211.11, 239, 578, 348/584, 586, 594, 595, 597; 382/154
See application file for complete search history.

(56) References Cited

U.S. PATENT DOCUMENTS

| | | | | |
|---|---|---|---|---|
| 2010/0097444 | A1* | 4/2010 | Lablans | H04N 5/23238 348/46 |
| 2010/0309337 | A1* | 12/2010 | Sim | G03B 13/00 348/239 |

FOREIGN PATENT DOCUMENTS

JP 2006229789 A 8/2006

* cited by examiner

*Primary Examiner* — Sherrie Hsia
(74) *Attorney, Agent, or Firm* — Carter, DeLuca & Farrell LLP

(57) ABSTRACT

An image capturing apparatus, comprising a first and a second image capturing units wherein the first and the second image capturing units arranged so that a part of an image capturing angle of view overlaps each other, the apparatus comprising a compositing unit configured to generate a composite image by performing compositing processing for combining images captured by each of the first and the second image capturing units, wherein the compositing unit, in a case where a first subject image and a second subject image, which are subject images of the same subject, are included duplicatively in the composite image, makes the second subject image not be displayed in the composite image by using a background image corresponding to a position of the second subject image.

13 Claims, 18 Drawing Sheets

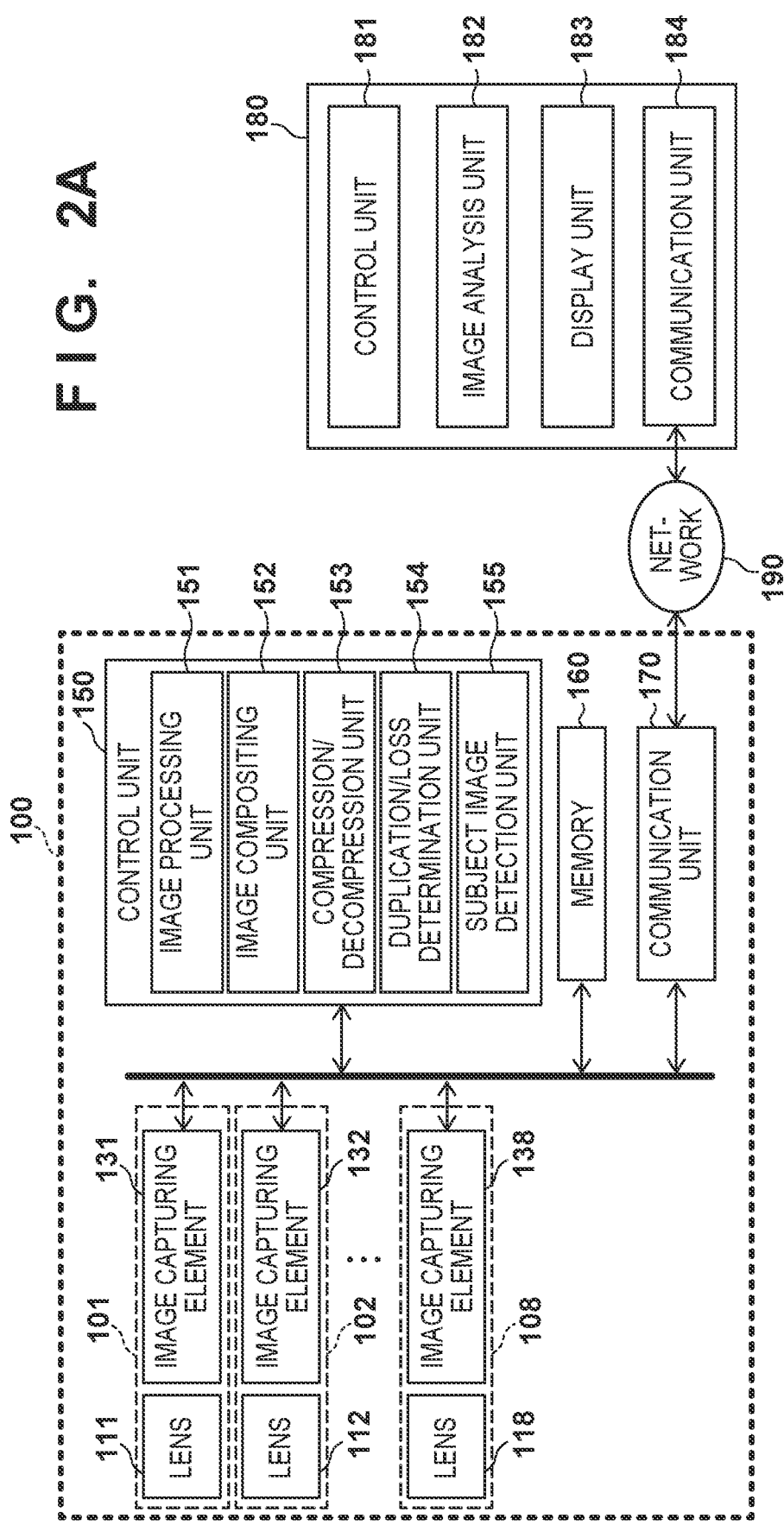

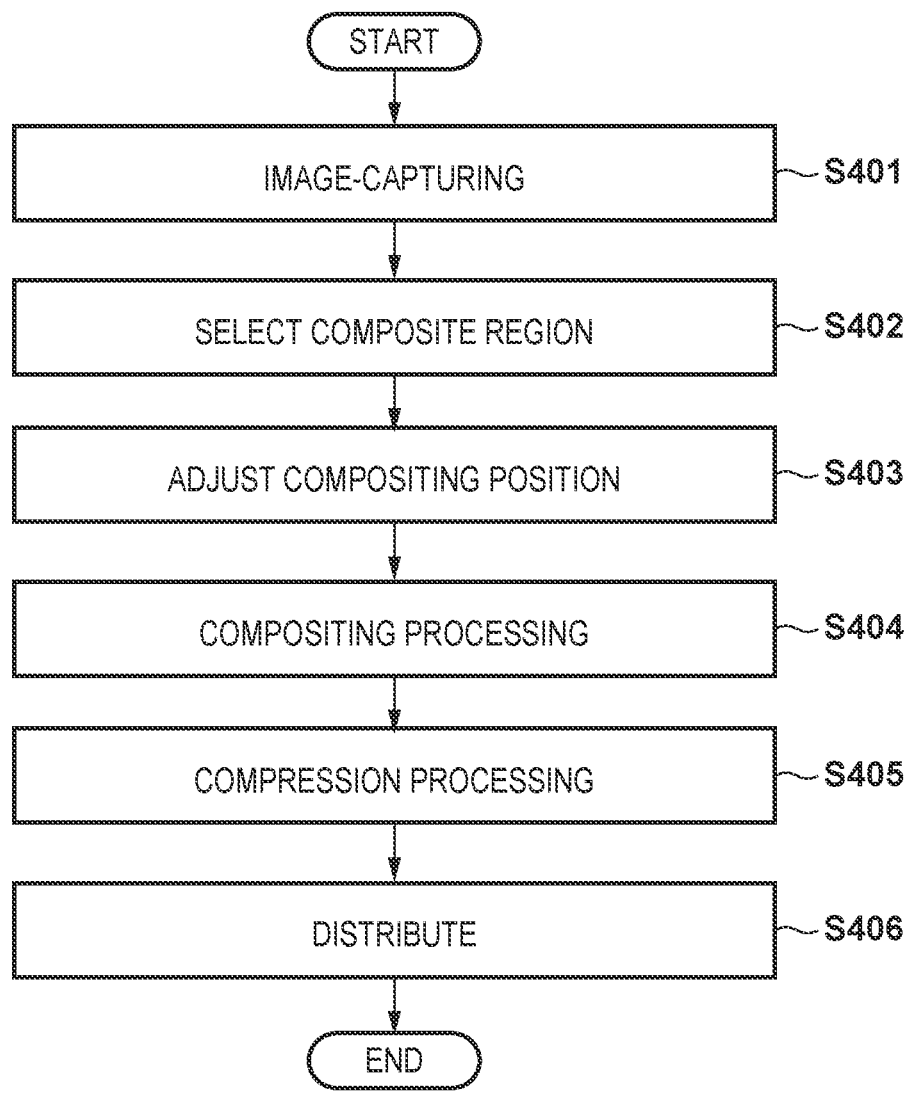

F I G. 12A
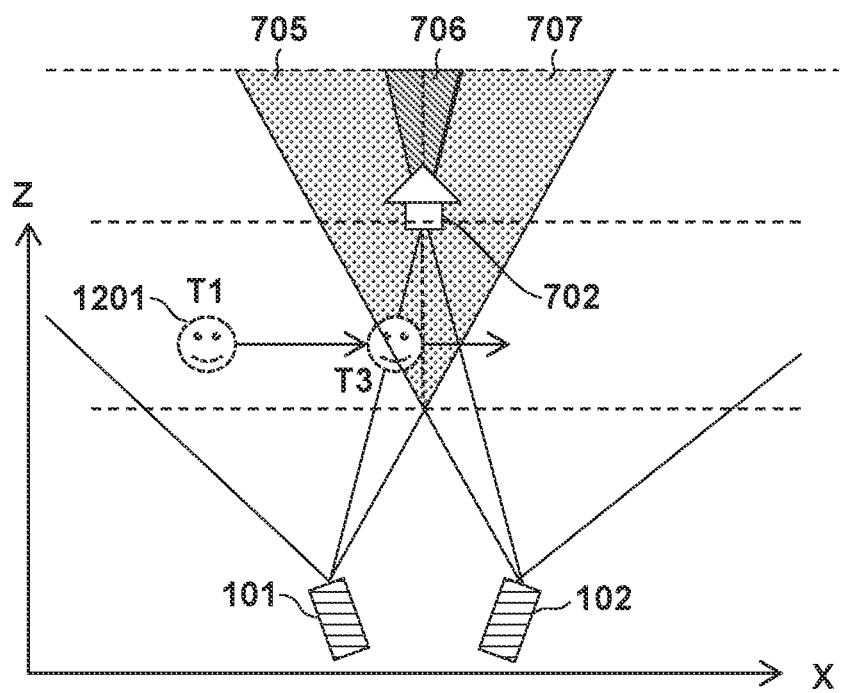

IMAGE CAPTURING APPARATUS, METHOD OF CONTROLLING IMAGE CAPTURING APPARATUS, AND NON-TRANSITORY COMPUTER-READABLE STORAGE MEDIUM

BACKGROUND OF THE INVENTION

Field of the Invention

The present disclosure relates to an image capturing apparatus, a method of controlling an image capturing apparatus, and a non-transitory computer-readable storage medium.

Description of the Related Art

An image capturing apparatus that realizes a wide field of view by arranging a plurality of lenses and image capturing elements and compositing obtained images has been proposed as an image capturing apparatus that can capture an image with a wide field of view. Japanese Patent Laid-Open No. 2006-229789 discloses a monitoring system that composites captured images that are captured by a plurality of cameras and displays a panoramic image. Also, determination of the existence or absence of a person passing within a set region and a person count detection function for counting the number of people within a region are implemented as image analysis functions in an image capturing apparatus that is intended to be used for monitoring and the like.

In the case of performing image analysis by using a composite image obtained by the image capturing apparatus of Japanese Patent Laid-Open No. 2006-229789, the following problem arises.

Due to the configuration of the arrangement of the plurality of image capturing apparatuses, depending on the position of a subject, there are cases in which there is a region in which a double image occurs or a region in which a loss occurs at a join of images in the composite image. In particular, in the image capturing apparatus that Japanese Patent Laid-Open No. 2006-229789 discloses, there is a possibility that the position of a subject other than the subject image will be misaligned due to images being composited by aligning positions with respect to the subject image, resulting in a double image or a loss depending on the compositing position. Thus, there is a possibility that an error will occur when a subject of interest passes through the composite region of the image in a case where such a composite image is analyzed to perform a person count detection. Specifically, some or all of the subjects will not be detectable due to a loss, or the number of people will be miscounted due to duplication, leading to misdetection.

SUMMARY OF THE INVENTION

Accordingly, a technique for providing a composite image in which erroneous detection in a composite region can be prevented is provided.

One aspect of exemplary embodiments relates to an image capturing apparatus, comprising a first and a second capturing units wherein each of the first and the second image capturing units arranged so that a part of an image capturing angle of view overlaps each other, the apparatus comprising a compositing unit configured to generate a composite image by performing compositing processing for combining images captured by each of the first and the second image capturing units, wherein the compositing unit, in a case where a first subject image and a second subject image, which are subject images of the same subject, are included duplicatively in the composite image, makes the second subject image not be displayed in the composite image by using a background image corresponding to a position of the second subject image.

Further features of the present invention will become apparent from the following description of exemplary embodiments (with reference to the attached drawings).

BRIEF DESCRIPTION OF THE DRAWINGS

FIG. 2A is a view illustrating a functional configuration of an image capturing apparatus 100 and a client apparatus 180 according to exemplary embodiments.

FIG. 4 is a flowchart illustrating one example of processing in the image capturing apparatus 100 according to exemplary embodiments.

FIG. 12A is a view illustrating one example of a case in which a scene, in which a subject 1201 that moves within image capturing angles of view of image capturing units 101 and 102 is captured, is viewed from above according to a third embodiment.

DESCRIPTION OF THE EMBODIMENTS

Hereinafter, exemplary embodiments will be described in detail based on the attached drawings.

First Embodiment

In the following embodiments, embodiments relating to an image capturing apparatus that can generate a wide-angle image or a wide-angle video obtained by compositing images captured by a plurality of image capturing units is described.

Figure 1A:
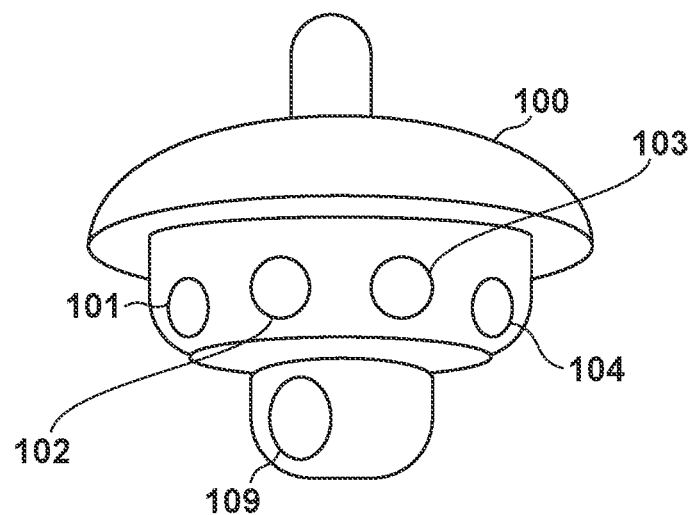
FIG. 1A is a view illustrating a configuration example of an image capturing apparatus according to exemplary embodiments.
Figure 1B:
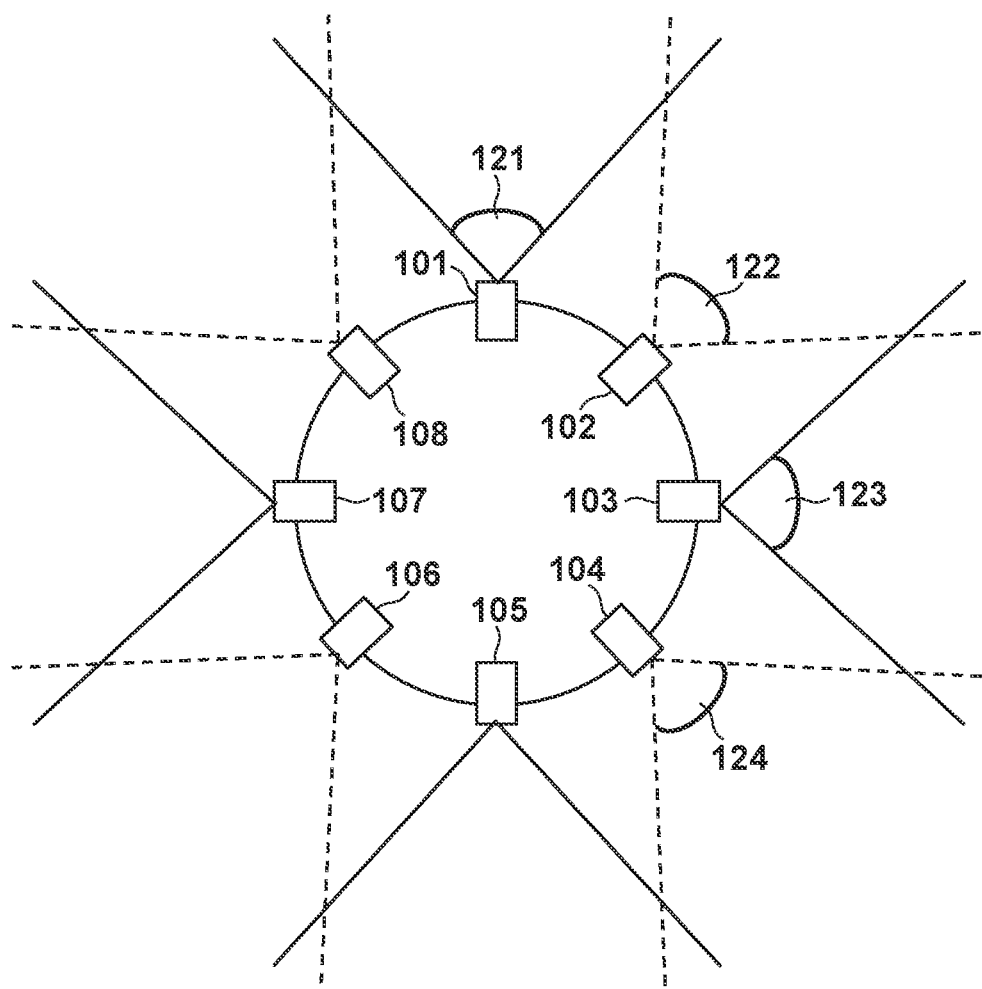
FIG. 1B is a view for describing an arrangement of image capturing units in the image capturing apparatus according to exemplary embodiments.

Firstly, FIG. 1A is a schematic view illustrating a configuration of an image capturing apparatus 100 in the present embodiment. FIG. 1B is a schematic drawing planarly illustrating an arrangement of each image capturing unit within the image capturing apparatus 100. An example in which the image capturing apparatus 100 is configured by eight image capturing units 101 to 108, as illustrated in FIG. 1B, is given in the present embodiment. The image capturing apparatus 100 also comprises an additional image capturing unit 109. Each of the image capturing units 101 to 108 are image capturing units equipped with an optical lens system and an image capturing element, and are arranged radially with respect to the center of the image capturing apparatus 100, and it is possible to capture a 360-degree range. The image capturing unit 109 is an image capturing unit that is equipped with a pan/tilt/zoom (PTZ) mechanism in addition to an optical lens system and an image capturing element. In the present embodiment, a range of 360 degrees is covered by the eight image capturing units 101 to 108, but the number of image capturing units is not limited to this, and the range that can be captured may be more narrow than 360 degrees. For example, the image capturing range may be determined in accordance with the place of installation. The image capturing apparatus 100 can be configured to be equipped with a first image capturing unit equipped with a wide field of view in a horizontal direction made up of a plurality of image capturing units and a second image capturing unit that can face arbitrary image capturing directions and change its image capturing angle of view.

Each image capturing unit has an image capturing angle of view and these are alternatingly indicated by solid lines and dotted lines in FIG. 1B. For example, the image capturing units are arranged so that parts of the respective image capturing angles of view overlap as do an image capturing angle of view 121 of the image capturing unit 101 and an image capturing angle of view 122 of the neighboring image capturing unit 102. The image capturing apparatus 100 can composite images captured by each image capturing unit and generate a wide-angle video having horizontal field of view of a maximum of 360°.

Figure 2B:
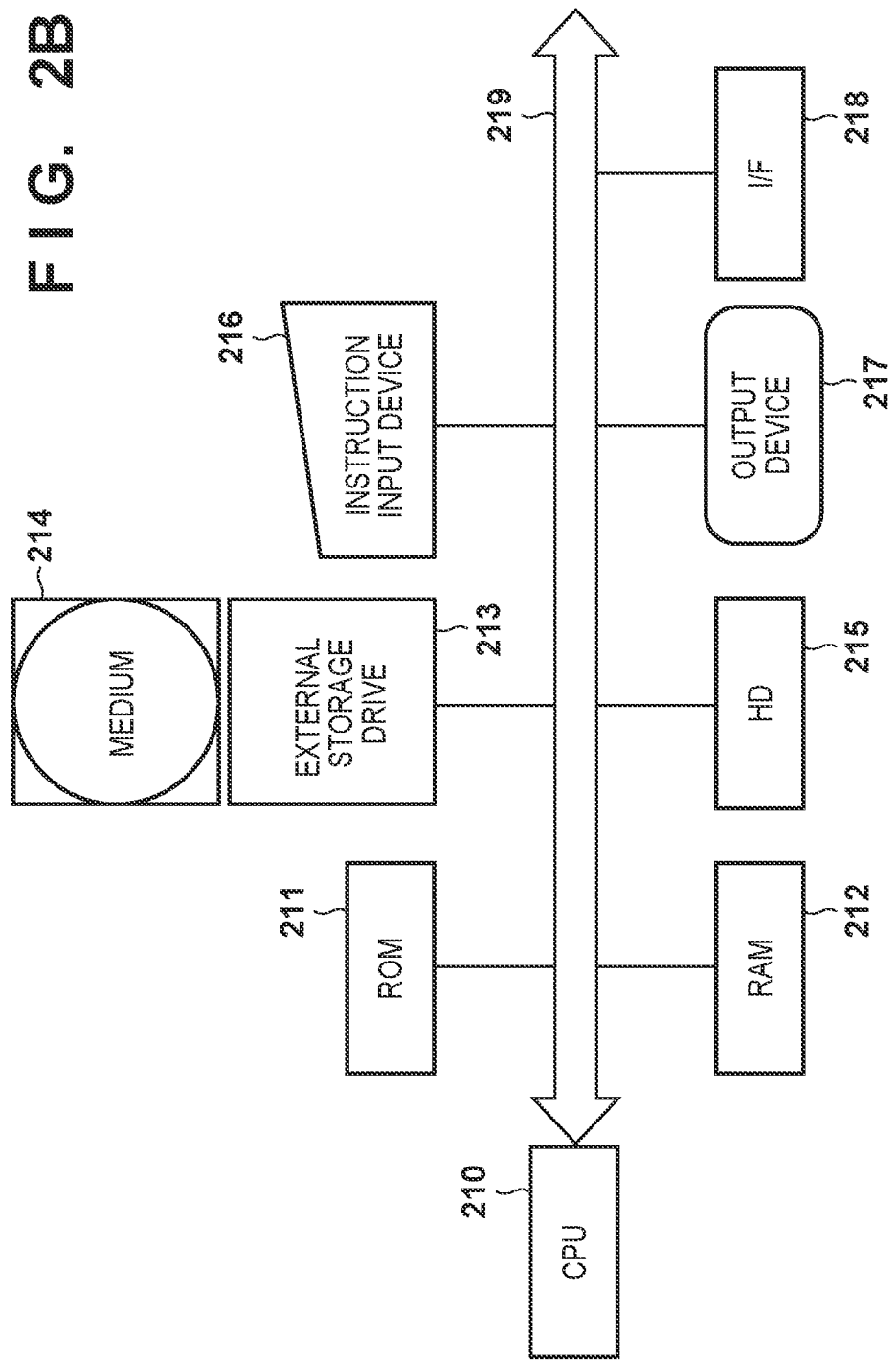
FIG. 2B is a view illustrating an example of a hardware configuration of the image capturing apparatus 100 and the client apparatus 180 according to exemplary embodiments.

Next, description will be given with reference to FIG. 2A and FIG. 2B regarding a functional configuration and hardware configuration of the image capturing apparatus 100 and a client apparatus 180. FIG. 2A is a schematic view illustrating an example of a functional configuration of the image capturing apparatus 100 and the client apparatus 180 according to exemplary embodiments. A control unit 150 can be configured by a CPU, an MPU, another dedicated computation circuit, or the like, for example, and controls the whole image capturing apparatus 100. A memory 160 is configured by a non-volatile memory, a RAM, or the like. The non-volatile memory stores processing procedures (control programs) or various parameters of the control unit 150. The RAM is used as a work area of the control unit 150 and is also used as a storage region for performing image processing. Also, the control unit 150 can include an image processing unit 151, an image compositing unit 152, a compression/decompression unit 153, a duplication/loss determination unit 154, and a subject image detection unit 155, and processing functions that these blocks have can be realized by the CPU executing corresponding programs stored in the memory 160, for example. Alternatively, they may be realized by a dedicated operation circuit in which the control unit 150 is configured.

The image capturing units 101 to 108 each have a unit configuration that includes image capturing elements 131 to 138 and optical lens systems 111 to 118. Each image capturing unit is connected with the control unit 150 and controlled thereby, and the image capturing units thereby capture images in synchronism with each other. Composite image data of one frame is formed through the subsequent compositing processing on image capture signals obtained by such synchronized image capturing. Accordingly, hereinafter, "each frame" means an image capture signal obtained by synchronized image capturing and image data obtained from the image capture signal. On the image capture signal transmitted from the image capturing unit 101, various image processing is applied in the control unit 150. The image capturing elements 131 to 138 are configured by a CMOS sensor or the like, convert the subject image formed on the image capturing plane into an electrical signal, and output the electrical signal. An image capture signal which is an electrical signal outputted from the image capturing element 131 or the like is inputted into the image processing unit 151 in the control unit.

The image processing unit 151 performs image processing such as pixel interpolation processing and color conversion processing on the image capture signal, and generates captured image data ("captured image" or "pre-compositing image" as an image that is the target of compositing processing) for each image capturing unit. Image processing encompasses, for example, various correction processing such as pixel defect correction, lens correction, detection processing for performing adjustment of black level, focus, exposure or the like, demosaicing processing, white balance processing, white balance processing and gamma correction processing, edge enhancement processing, noise suppression processing, or the like. Respective captured image data is saved in the memory 160. Furthermore, the captured image data of images of respective image capturing units that is saved in the memory 160 is composited successively for each frame by the image compositing unit 152, and is saved as wide-angle composite image data in the memory 160.

The control unit 150 further generates compressed image data by compressing the composite image data in the compression/decompression unit 153. The compression/decompression unit 153 executes still image compression and moving image compression, and can perform image compression according to, for example, H.264, H.265, MPEG, and JPEG standards, and the like. Furthermore, the compression/decompression unit 153 may generate image data of an appropriate format including mp4 and avi formats and the like. The compressed image data generated in the compression/decompression unit 153 is recorded on a recording medium or built-in memory (not shown) installed in the image capturing apparatus 100, and transmitted to the client apparatus 180 which is an external information processing apparatus from a communication unit 170 via a network 190.

The duplication/loss determination unit 154 compares a plurality of pre-compositing images to be composited, and determines whether duplication or loss of a subject image will be present after compositing. Also, the duplication/loss determination unit 154 determines whether subject images included in one set of images to be composited are the same subject. The subject image detection unit 155 detects a subject image in a designated image region, and notifies the result of detection to the image compositing unit 152 and the duplication/loss determination unit 154. The communication unit 170 is a network processing circuit, and after converting compressed composite image data into a communication signal compliant with a communication protocol, the communication unit 170 distributes the communication signal on the network 190.

The client apparatus 180 is typically an information processing apparatus such as a personal computer, and is connected to the image capturing apparatus 100 via the network 190. A control unit 181 of the client apparatus 180 can be configured by a CPU, an MPU, another dedicated computation circuit, or the like, and is responsible for control of the client apparatus 180 as a whole. Also, the control unit 181, in addition to receiving composite image data from the image capturing apparatus 100 and performing decompression processing thereon, performs various control by transmitting control information for controlling the image capturing apparatus 100. An image analysis unit 182 performs image analysis on composite image data received from the image capturing apparatus 100. Also, decompression processing may be performed in the image analysis unit 182. In image analysis, for example, processing is performed to detect and count subjects present in a specific region in the composite image data, to detect movement of the subjects, and to detect an intrusion into a predetermined region. A display unit 183 displays to the operator of the client apparatus 180 image analysis results and composite image data received from the image capturing apparatus 100. A communication unit 184 is a network processing circuit, and can communicate with the image capturing apparatus 100 via the network 190, and receive composite image data that the image capturing apparatus 100 distributed, as well as control operation of the image capturing apparatus 100.

One example of a hardware configuration of the above-described image capturing apparatus 100 and client apparatus 180 is illustrated in FIG. 2B. FIG. 2B is a block diagram illustrating an example of a hardware configuration mainly related to a control unit and processing units of the image capturing apparatus 100 and the client apparatus 180.

In FIG. 2B, a CPU 210 executes an operating system (OS), control programs, processing programs, and the like that are stored in the hard disk device (hereinafter, referred to as the HD) 215 to realize processing corresponding to the exemplary embodiments. Furthermore, the CPU 210 controls data transmission/reception with respect to external apparatuses via an interface (I/F) 218. The CPU 210 may function as the control units 150 and 181 of FIG. 2A.

A ROM 211, in addition to a basic I/O program, internally stores various data of application programs and the like that execute predetermined processing. A RAM 212 temporarily stores various data, and functions as a main memory, a work area, or the like for the CPU 210. An external storage drive 213 is an external storage drive for realizing access to the recording medium, and can load programs that are stored on the media (recording media) 214 into a main computer system. For a hard disk device 215, an HD (hard disk) which functions as a large capacity memory is used in the present embodiment. The HD 215 stores application programs, an OS, control programs, and related programs, and the like. Note that instead of the hard disk, non-volatile storage device such as a flash memory may be used. The ROM, the RAM, the HD and the like function as the memory 160 of FIG. 2A.

An instruction input device 216 corresponds to a keyboard, a pointing device (a mouse, or the like), a touch panel, or the like. An output device 217 outputs commands inputted from the instruction input device 216, responses thereto, and the like. The output device 217 may include a display, a loudspeaker, and a headphone terminal. The output device 217 corresponds to the display unit 183 of FIG. 2A. A system bus 219 is responsible for a flow of data in the apparatus.

The interface (hereinafter, referred to as I/F) 218 fulfills the role of mediating the exchange of data with external apparatuses. More specifically, the I/F 218 can include a wireless communication module, and the module can include well-known circuit mechanisms including an antenna system, an RF transmitter/receiver, one or more amplifiers, a tuner, one or more oscillators, a digital signal processor, a CODEC chipset, a subscriber identification module card, a memory, and the like. Furthermore, the I/F 218 can include a wired communication module for wired connection. The wired communication module allows communication with another device via one or more external ports. Also, the I/F 218 can include various software components that process data. The external port is coupled with another device directly via Ethernet, USB, IEEE 1394, or the like or indirectly via a network. Note that an alternative to a hardware apparatus may be configured by software that implements the same functions as those of the respective apparatuses described above. The interface 218 may function as the communication units 170 and 184 of FIG. 2A.

Figure 3A:
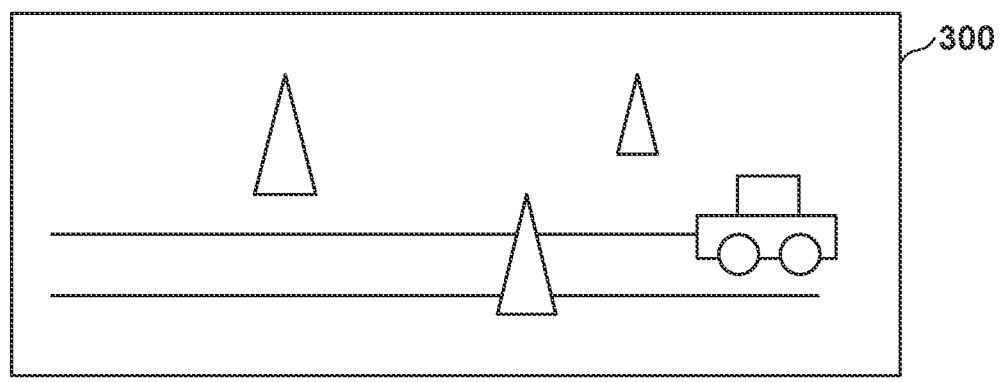
FIG. 3A is a view illustrating an example of a composite image according to exemplary embodiments.
Figure 3B:
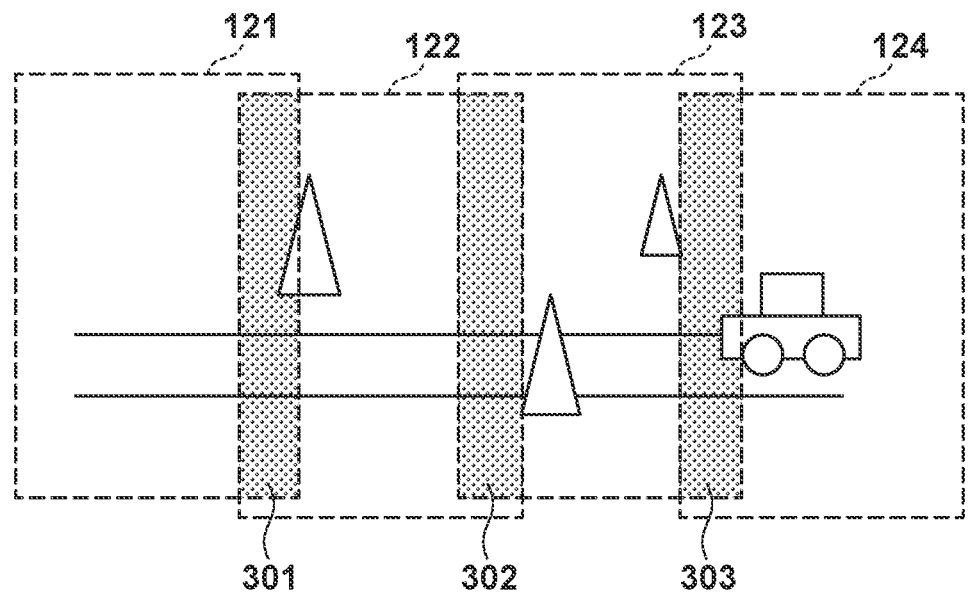
FIG. 3B is a view for describing a relationship between a subject and an image capturing angle of view of each image capturing unit of the image capturing apparatus 100 according to exemplary embodiments.

Next, with reference FIG. 3A, FIG. 3B, and FIG. 4, image compositing processing in the present embodiment will be described. Below, in particular, a case in which a wide-angle video is generated will be described. Firstly, with reference to FIG. 3A and FIG. 3B, the relationship between the subject and an image capturing angle of view of each the image capturing unit of the image capturing apparatus 100 corresponding to embodiments will be described. FIG. 3A illustrates an example of a composite image 300 obtained by combining the respective captured images that are captured by the image capturing units 101 to 104. FIG. 3B is a view for describing a relationship between a subject and an image capturing angle of view of each image capturing unit of the image capturing apparatus 100. Hereinafter, image compositing processing for compositing of the respective captured images that are captured by the image capturing units 101 to 104 that is executed in order to obtain a composite image such as the composite image 300 will be described. In FIG. 3B, dashed lines 121 to 124 correspond to image capturing angle of views 121 to 124 of the image capturing units 101 to 104 of FIG. 1A. As shown here, the image capturing angles of view of the respective image capturing units are set to partially overlap each other.

In the case where the images captured by the respective image capturing units are combined, there is a parallax between the neighboring image capturing units due to the arrangement of the image capturing units, and in the image regions (image overlap regions) where the image capturing angles of view are overlapping, compositing position adjustment for images to be composited is necessary for each frame. The compositing position adjustment is performed so that the same subject image is overlapped in the image overlap region. In the example illustrated in FIG. 3B, shaded regions 301 to 303 are image overlap regions. The image overlap regions can be set as appropriate by setting the image capturing angles of view in accordance with the subject distance when the image capturing apparatus 100 is installed. Also, the image overlap regions may be configured to be changeable as appropriate in accordance with the subject. The image capturing apparatus 100 composites captured images from the respective image capturing units, and obtains the composite image 300. Here, four captured images are composited, but configuration may be taken to composite all of the captured images that are captured in synchronism, 8 in the case of the image capturing apparatus 100 illustrated in FIG. 1A, as one composite image, or configuration may be taken to generate a plurality of composite images by compositing captured images in units of subgroups. For example, configuration may be taken to generate a total of two composite images for subgroups of four images each. Furthermore, the number of images in the compositing is not limited to these.

Next, with reference to FIG. 4, image compositing processing will be described in the present embodiment. FIG. 4 is a flowchart that illustrates an example of image compositing processing corresponding to exemplary embodiments. Processing corresponding to the flowchart can be realized by, for example, one or more processors (the CPU and MPU of the control unit 150), functioning as the control unit 150, executing corresponding programs (stored in the memory 160 or the like).

Firstly, in step S401, the control unit 150 makes an image capture instruction to each image capturing element of the image capturing units 101 to 108. Each image capturing element performs an image capture operation based on the image capture instruction from the control unit 150, and the image capture signals outputted from the respective image capturing units are stored in the RAM of the memory 160. The image capture signals received from the image capturing units are held once again in the memory as captured image data after performing predetermined image processing thereon such as pixel interpolation processing, color conversion processing, and the like in the image processing unit 151.

In subsequent step S402, the control unit 150 selects partial image data corresponding to image overlap regions from the captured image data stored in the memory 160, and supplies it to the image compositing unit 152. In subsequent step S403, the image compositing unit 152 performs compositing position adjustment. The image compositing unit 152 detects the same subject in the image data of the respective image overlap regions between two images to be composited, and calculates compositing parameters for compositing so that the positions of the same subject detected in the pre-compositing images match. In the compositing parameters, parameters for performing transformation processing such as enlarging, reducing, and distortion correction of the data of each captured image and parameters for performing image extraction from the post-correction processing captured image data are included. To detect the same subject, for example, it is possible to determine the same subject by performing edge detection by background difference or the like and extracting the contour shape of a subject, or extracting motion vectors, and making the determination in conjunction with color pixel information. Note that processing of step S402 and step S403 may be executed by the image compositing unit 152 collectively.

In subsequent step S404, the image compositing unit 152 performs compositing processing by combining captured image data obtained from the respective image capturing units and generating composite image data. Based on the calculated compositing parameters, compositing position correction processing is performed for the respective captured image data, and compositing is performed for each frame. After that, scaling processing is performed, trimming to a designated angle of view size is performed, and the wide-angle composite image data is generated. The generated composite image data is saved in the memory 160 with information (image compositing information) related to image compositing processing that the image compositing unit 152 performed. In the subsequent step S405, the compression/decompression unit 153 successively performs compression processing on the composite image data that was composited and outputs the result to the communication unit 170 as moving image data. At that time, image compositing information that the image compositing unit 152 generated is added to the moving image data. In subsequent step S406, the communication unit 170 distributes moving image data to the client apparatus 180 via the network 190 based on a predetermined protocol.

Figure 5A:
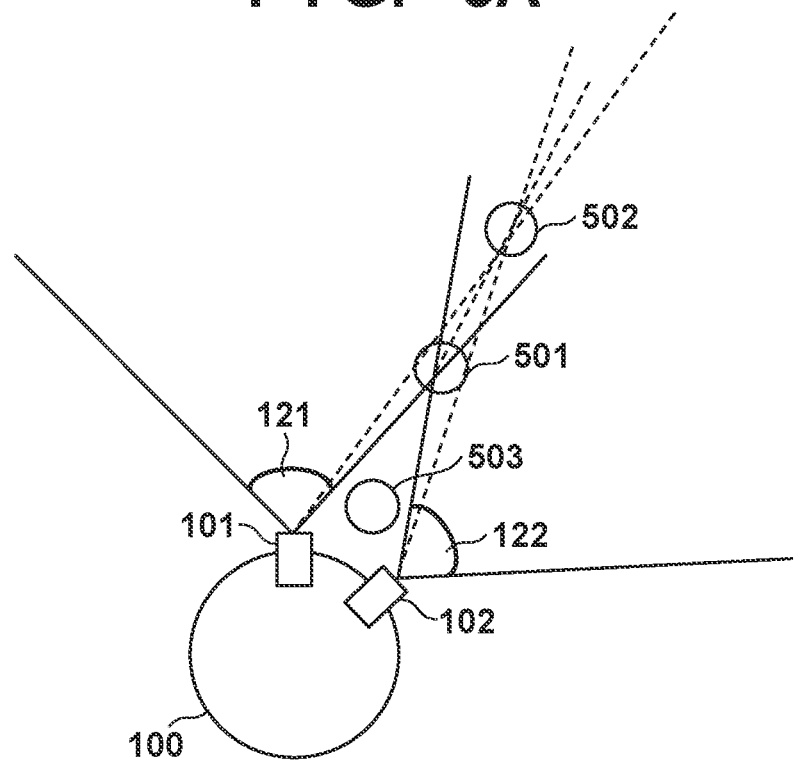
FIG. 5A is a view for describing an occurrence of duplication/loss of a subject image according to exemplary embodiments.
Figure 5B:
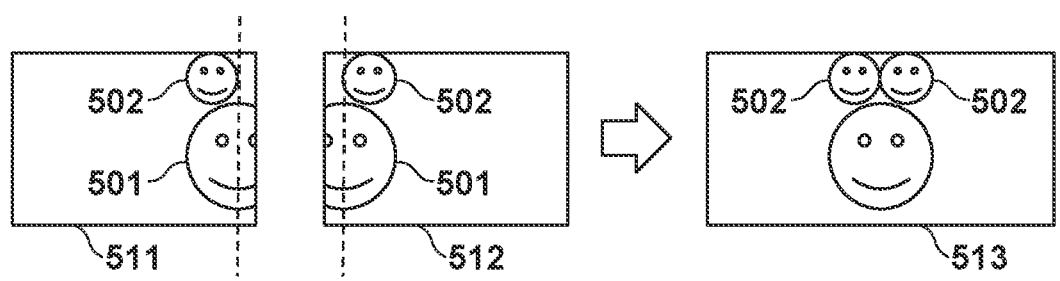
FIG. 5B is a view illustrating one example of image data of each image capturing unit that captured a subject and a composite image after compositing according to exemplary embodiments.
Figure 5C:
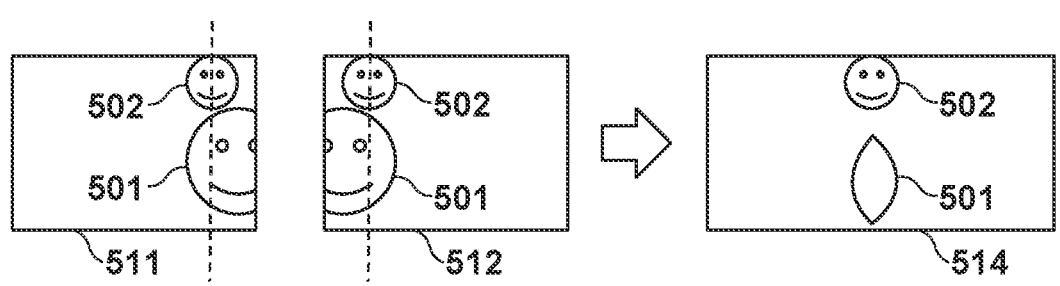
FIG. 5C is a view illustrating another example of image data of each image capturing unit that captured a subject and a composite image after compositing according to exemplary embodiments.

Next, with reference to FIG. 5A to FIG. 5C, description is given regarding the occurrence of duplication and loss of a subject image in image compositing processing of the image compositing unit 152. FIG. 5A is a view for describing a relationship between the image capturing angles of view of the image capturing apparatus 100 and the subject position. Here, the relationship between the image capturing unit 101 and the image capturing unit 102 is illustrated, but this omits other image capturing units simply to give an example, and a similar relationship holds for other image capturing units. Since the installation positions differ for the respective image capturing units 101 and 102 of the image capturing apparatus 100, their image capturing angles of view and the positions of the center of their optical axes do not match. Accordingly, there are cases where the subject is not in the image capturing angle of view of an image capturing unit depending on its position. Subjects 501 to 503 are subjects whose distances from the image capturing apparatus 100 are different. The subjects 501 and 502 are subjects in the image capturing angles of view 121 and 122, and the position of the subject 503 is outside both the image capturing angles of view.

FIG. 5B and FIG. 5C are views illustrating examples of image data of each image capturing unit that captured subjects of FIG. 5A and a composite image after compositing. First, in the example of FIG. 5B, image data 511 and image data 512 are composited to obtain a composite image 513. Also, in the example of FIG. 5C, captured image 511 and captured image 512 are composited to obtain composite image 514. The compositing positions of the composite image 513 and the composite image 514 are different to each other. For the composite image 513 illustrated in FIG. 5B, positional alignment is performed in relation to the subject 501, and the entire image of the subject 501 fits well within the composite image. However, the image of the subject 502 is duplicated (a "multiple-image") in the composite image 513.

For the composite image 514 illustrated in FIG. 5C, positional alignment is performed in relation to the subject 502, and the entire image of the subject 502 fits well within the composite image. However, the image of the subject 501 is composited such that a partial region thereof is lost, and the state is such that it is difficult to distinguish the original subject 501.

As described above, duplication or loss of a subject image in the composite image occurs in accordance with the relationship between the subject position and the compositing position. Thereby, there is the possibility that the client apparatus 180 that received the composite image will make a misdetection when performing image analysis. Accordingly, the image capturing apparatus 100 corresponding to the present embodiment, in order to prevent a misdetection in the client apparatus 180, generates a composite image in the image compositing unit 152 such that duplication and loss of a subject image does not occur. The image compositing unit 152 generates the composite image so that, for duplicative subject images, only one of the subject images remains and the other subject image is not displayed (deleted, cleared, removed, cancelled, hidden, or occluded). Also, regarding a subject image for which a loss occurs, a composite image is generated so that a subject image without a loss is included therein. Hereinafter, details of a method of generating a composite image for preventing a multiple-image misdetection will be described.

Figure 6:
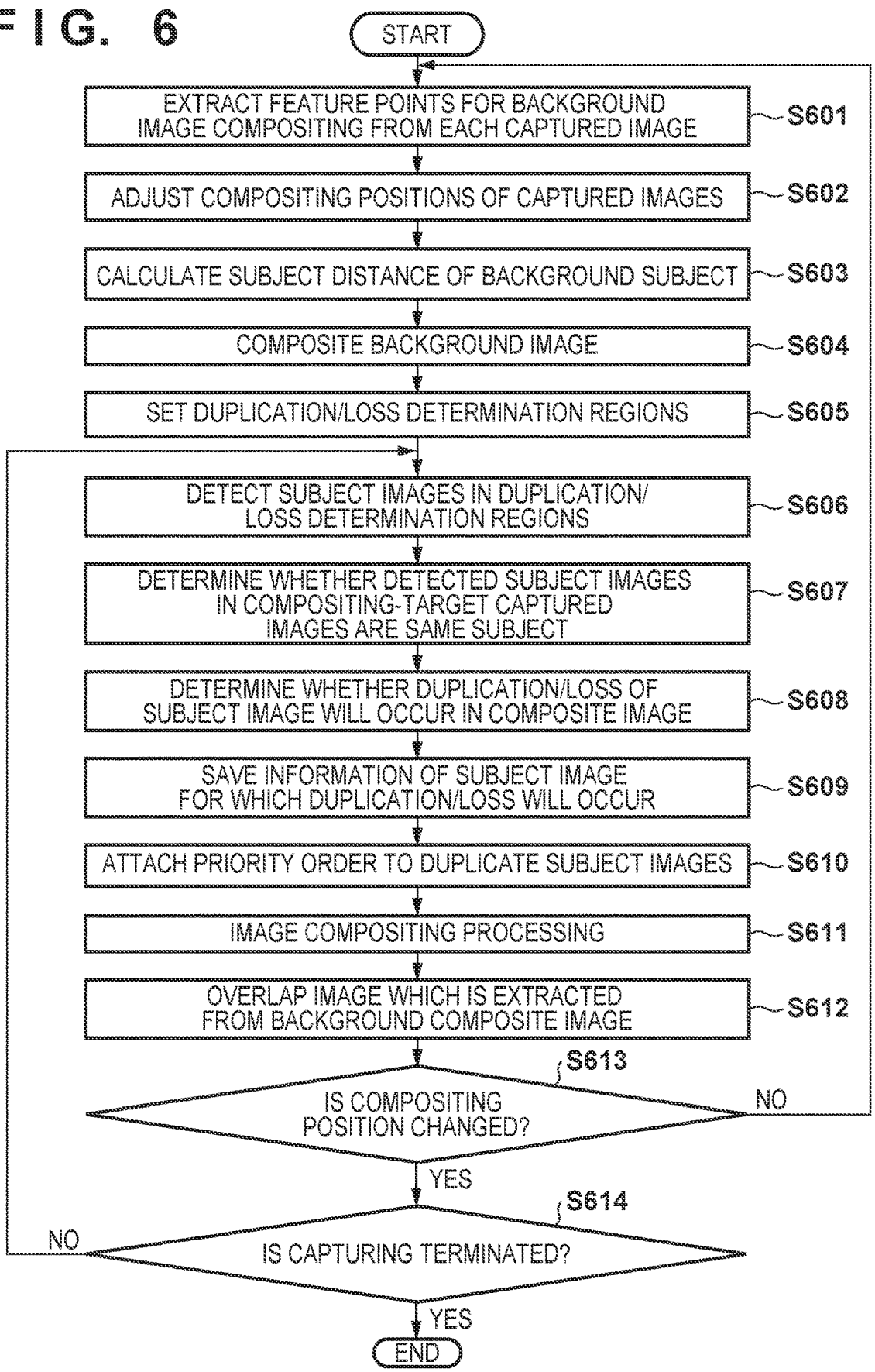
FIG. 6 is a flowchart illustrating an overview of a method of generating a composite image according to exemplary embodiments.

Next, with reference to FIG. 6, an overview of image compositing processing corresponding to the present embodiment will be described. FIG. 6 is a flowchart corresponds to an example of image compositing processing corresponding to exemplary embodiments. In FIG. 6, processing from step S601 to step S604 corresponds to compositing processing operation when the image capturing apparatus 100 is installed, and the processing from step S605 to step S612 corresponds to processing from when capturing is started until the subject image is captured as a subject. Processing corresponding to the flowchart can be realized by, for example, one or more processors (the CPU and MPU), functioning as the control unit 150, executing corresponding programs.

First, in step S601, when the image capturing apparatus 100 is installed in an image capturing environment, the image compositing unit 152 first performs an adjusting operation for performing image compositing. The image compositing unit 152 selects a stationary object that is a background image from each captured image (pre-compositing image) captured by the image capturing unit 101 or the like, and extracts feature points thereof. The adjusting operation for performing image compositing at the time of installation may be a selection of the background image by a user, and may be an automatic adjustment by the image capturing apparatus 100.

In subsequent step S602, the image compositing unit 152, in order to perform compositing as an image in which the background image is continuous, adjusts the compositing positions of the captured images. The image compositing unit 152 calculates a compositing parameter for performing compositing such that the positions of feature points within the image overlap regions between two images to be composited match. In the compositing parameter, information for performing transformation processing such as enlarging, reducing, and distortion correction of each captured image, and setting values for performing image extraction from the post-correction processing captured image are included. The compositing parameter is generated for each image compositing position. For example, in a case where two images are composited as illustrated in FIG. 5B there are two compositing parameters, and in a case where four images are composited in a row as in the images illustrated in FIG. 3B there are three compositing parameters in accordance with the three compositing positions. The compositing parameters used for image-compositing of an image are stored in a memory in correspondence with each compositing position in the composite image.

Next, in step S603, the image compositing unit 152 calculates a subject-distance of a background subject (a reference subject) extracted as feature points. The calculated subject-distance is stored in the memory 160 in association with the background subject. Calculation of the subject distance can be performed by triangulation from coordinates on two pre-compositing images of a target subject since the image capturing unit arrangement and image capturing angles of view are known information. Also, for example, in a case where the image capturing apparatus 100 comprises an image capturing element that can detect a phase difference of a subject image formed on the image capturing element, the image capturing apparatus 100 may calculate the subject-distance from a subject image formed on the image capturing element. Alternatively, as with a typical contrast-detection type AF (autofocus) operation, a method of detecting the subject-distance from contrast values that the subject image forms may be used. Also, the image capturing apparatus 100 may be of a configuration comprising distance measurement means such as a distance measurement sensor.

Next, in step S604, the image compositing unit 152 performs compositing of the background images whose positions were aligned. The background image composited by performing positional alignment based on a stationary object is hereinafter referred to as "background composite image". Some or all of the generated background composite images are held in the memory 160 with coordinate information. In subsequent step S605, the image compositing unit 152 sets a duplication/loss determination region which is a region that is the target of a determination on duplication/loss in relation to each pre-compositing image and the composite image. The duplication/loss determination region is set as a region that includes the above-described image overlap region.

In subsequent step S606, the subject image detection unit 155 performs detection of a subject image in the duplication/loss determination region that the image compositing unit 152 set. The subject image detection unit 155 detects a subject image in the duplication/loss determination region, and notifies the result of detection to the image compositing unit 152 and the duplication/loss determination unit 154. The detection of the subject image can be performed by, for example, performing edge detection of background differences and extracting the contour shape of a subject, comparing extracted contour shapes between a plurality of captured frames, and detecting motion vectors. The subject image detection unit 155 holds information of the extracted subject image in the memory 160. The information of the subject image that is held can include a contour shape of a subject image that is detected, shape information of a simplified shape resulting from the contour shape of a subject image being simplified, and an image within each shape, for example.

In subsequent step S607, the duplication/loss determination unit 154, for the subject image that the subject image detection unit 155 detected, determines whether or not the subject is the same. The determination of whether the subject is the same can be performed by evaluating whether motion vectors match, or whether subject shapes, subject colors, or the like match.

Figure 7A:
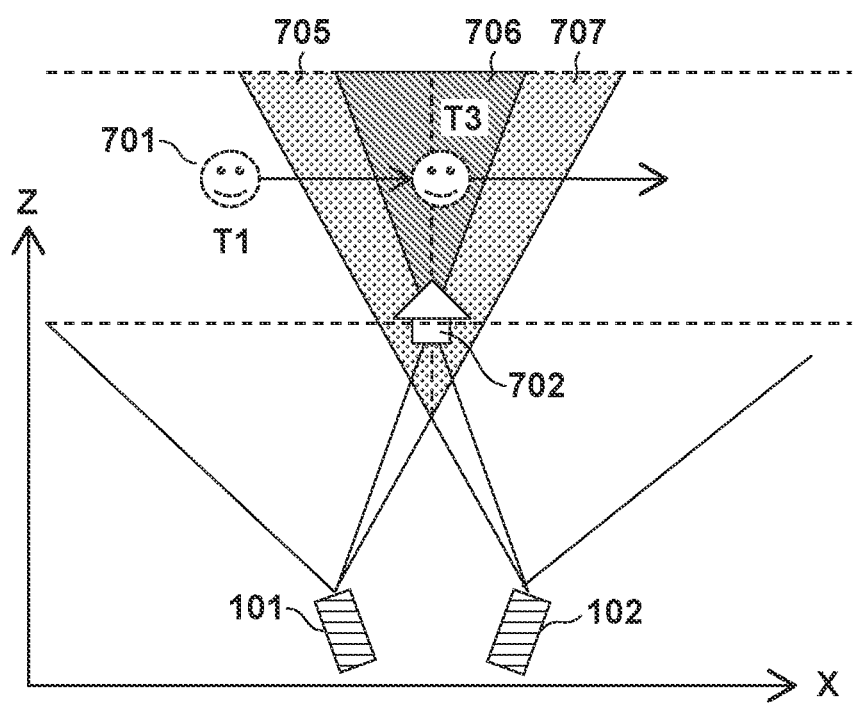
FIG. 7A is a view illustrating one example of a case in which a scene, in which a subject 701 that moves within the image capturing angles of view of image capturing units 101 and 102 is captured, is viewed from above according to a first embodiment.

In subsequent step S608, the duplication/loss determination unit 154 determines whether a position at which a subject image is present in a captured image is a position at which duplication or loss will occur when a composite image is generated. In this step, the duplication/loss determination unit 154 calculates the position of the subject image and determines whether or not duplication or loss will occur. Since arrangement and image capturing angles of view of the image capturing unit 101 and the like are known information, it is possible to calculate the position and distance of a subject in image capturing angles of view by using coordinates in two pre-compositing images of a target subject as parallax information. If the subject is in a multiple-image region, the subject image of that subject will result in a multiple-image after compositing. A multiple-image region is illustrated in FIG. 7A.

In subsequent step S609, the subject image detection unit 155 performs extraction of a subject image for which it is determined that duplication/loss will occur, and holds the information (shape information, an image) of the subject image in the memory 160. In subsequent step S610, the subject image detection unit 155, in the multiple-image region in which the target subject image is present, assigns a priority order in relation to the multiple-image that will occur. By this, a subject image that will be left in the composite image (a displayed subject image) and a subject image that will hidden from the composite image (a non-displayed subject image) are determined. In subsequent step S611, the image compositing unit 152 composites captured images that are compositing targets to generate a composite image. In subsequent step S612, the image compositing unit 152 extracts an image corresponding to the non-displayed subject image from the background composite image saved in the memory 160 and overlaps it onto the composite image.

In subsequent step S613, it is determined whether a compositing position for compositing background composite images is to be changed, and if there was a designation that the background compositing position is to be changed from the client apparatus 180 or the like, the processing returns to step S601, and once again the above-described processing is performed. In a case where no change was made to the compositing position of the background composite image, the processing from step S606 is repeated until termination of the image capture operation is selected in step S614. The compositing processing is performed by the steps above.

Hereinafter, with reference to FIG. 7A and FIG. 7B, a composite image generated by the compositing processing of FIG. 6 will be described. Here, description will be given of a method for clearing one of the duplicative subject images by overlapping of a background image in a case where there is a multiple-image in the image after compositing. Also, description will be given, with reference to the flowchart of FIG. 8, of a more detailed processing flow for when compositing is performed. Processing corresponding to the flowchart can be realized by, for example, one or more processors (the CPU and MPU), functioning as the control unit 150, executing corresponding programs.

FIG. 7A is a schematic drawing in which a scene, in which the subject 701 that moves within image capturing angles of view of the image capturing units 101 and 102 is captured, is viewed from above. Here, a case in which the subject 701 is moving in the direction of the arrow from position T1 to position T3 is illustrated.

A subject 702 is a subject that is stationary in the image capturing environment when the image capturing apparatus 100 is installed. The image capturing apparatus 100 can perform an adjustment of a compositing position based on the subject 702 to perform compositing of the background images. In the example illustrated in FIG. 7A, the subject 701 crosses positions that are further from the image capturing apparatus than where the subject 702 is. Spaces 705, 706, and 707 are image overlap regions where the image capturing angles of view of the image capturing units 101 and 102 overlap. Here, the space 706 is a multiple-image region, and a subject image for the subject present in the space 706 will be duplicative in the generated composite image.

Figure 7B:
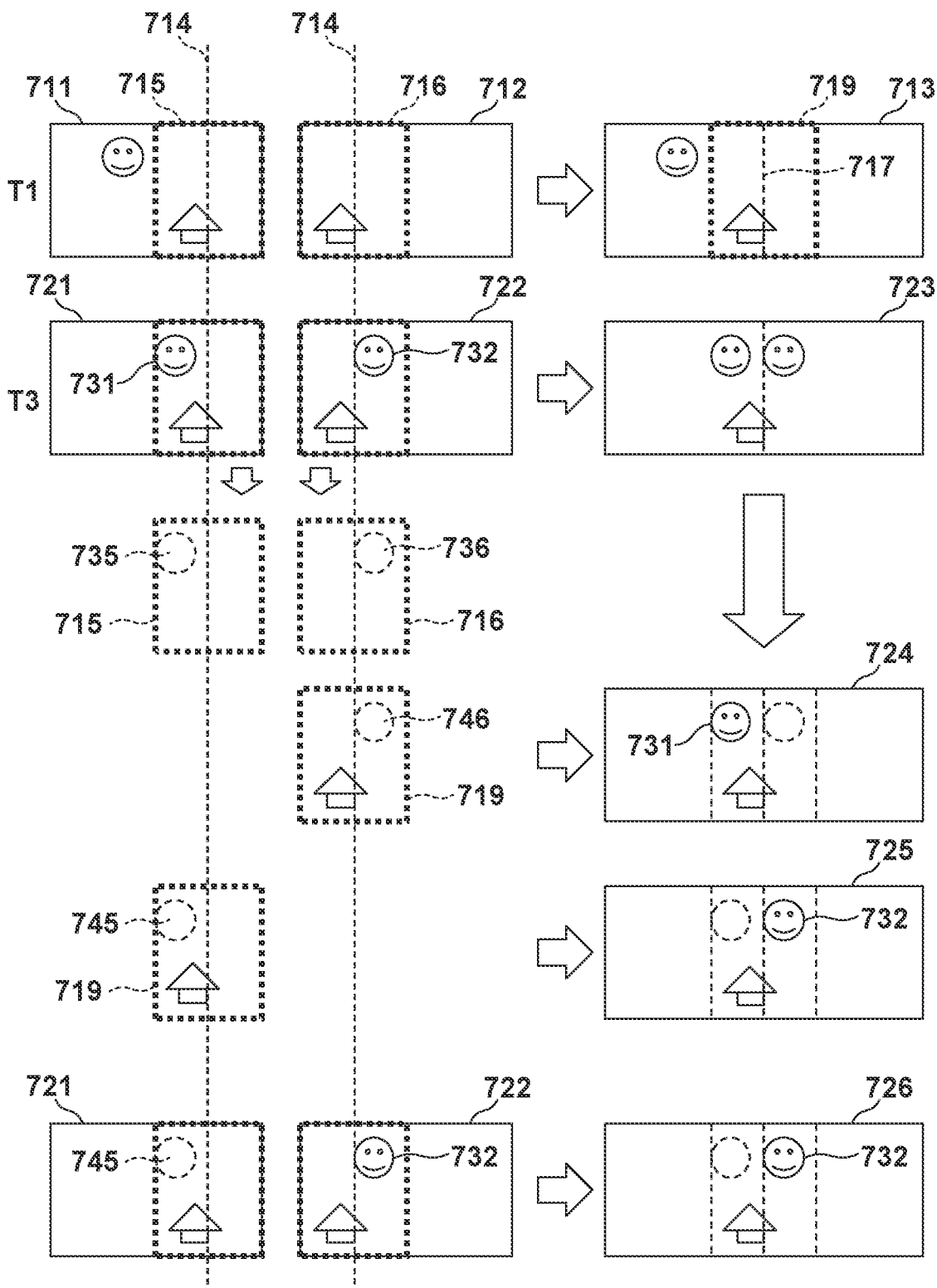
FIG. 7B is a view for describing a method of generating a composite image according to the first embodiment.

FIG. 7B illustrates captured images of FIG. 7A, and the images 711, 712, 721, and 722 are pre-compositing captured images (pre-compositing images) that are captured by the respective image capturing units, and the images 713 and 723 to 726 are post-compositing captured images (composite images). Also, capture results and compositing results for the case where the position of the subject 701 changes from the position T1 to the position T3 are illustrated. The regions 715 and 716 are duplication/loss determination regions set respectively in the pre-compositing images. The duplication/loss determination regions are set to include at least the captured images of the image overlap regions 705, 706, and 707 of FIG. 7A, and the size of the regions can be set to any size. Dashed lines 714 indicate the compositing positions of the pre-capture images, and here, the compositing positions for which image compositing positions adjustment was performed based on the subject 702 are indicated. The dashed line 717 indicates the boundary of the images in the composite image 713. The boundary corresponds to the dashed lines 714, and the part on the left side of the boundary 717 corresponds to the pre-compositing image 711, and the part on the right side of the boundary 717 corresponds to the pre-compositing image 712.

Figure 8:
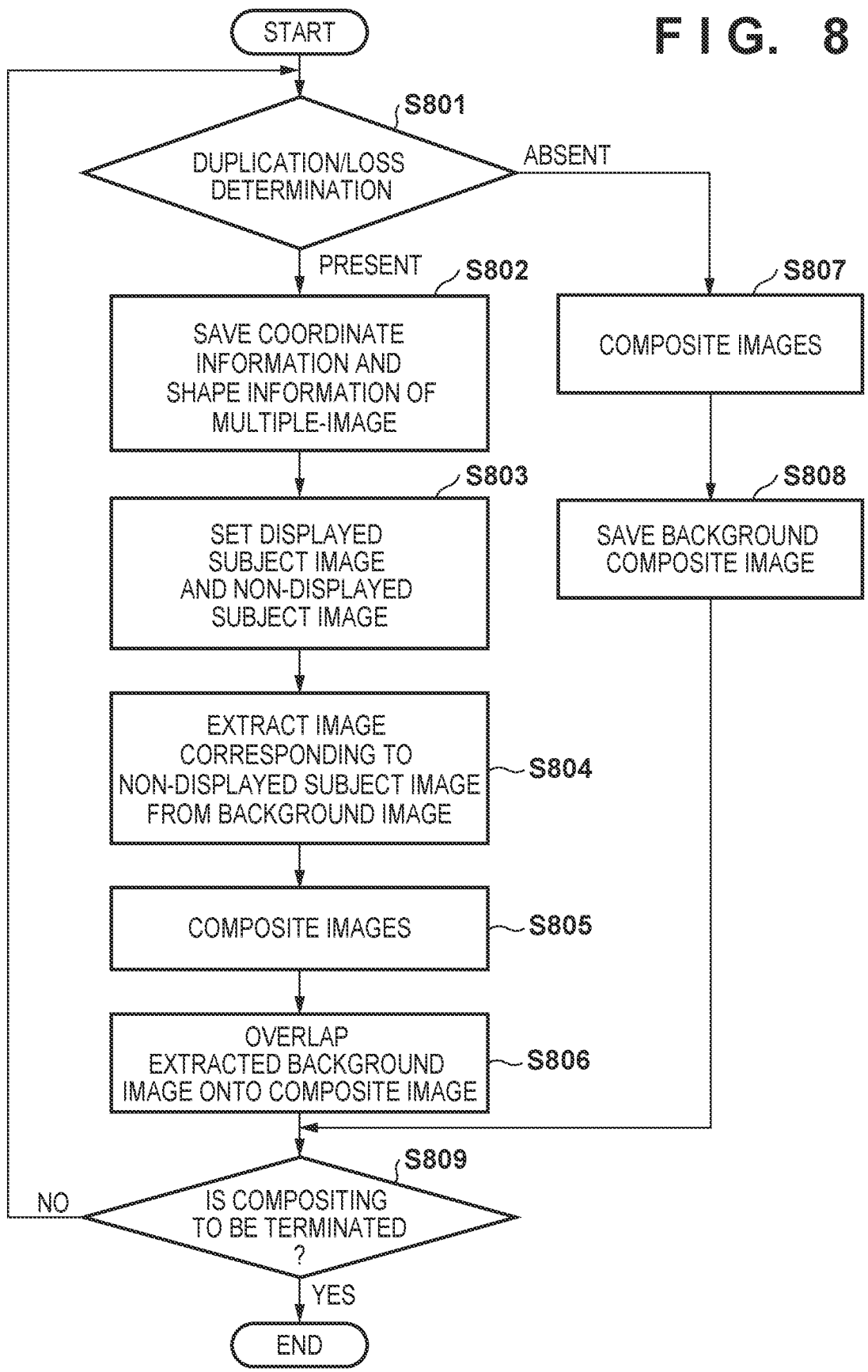
FIG. 8 is a flowchart illustrating an example of a method of generating a composite image according to the first embodiment.

Next, concrete description of a flow of compositing processing in a case where the subject 701 moves from the position T1 to the position T3 will be given according to the flowchart of FIG. 8. In step S801, the duplication/loss determination unit 154 determines whether or not a duplication or loss will occur in the composite image. First, when the subject 701 is at the position T1, the subject 701 is outside of the duplication/loss determination regions 715 and 716, and duplication/loss of the subject image of the subject 701 will not occur in the composite image 713. The subject image detection unit 155 detects that the subject image is not inside the duplication/loss determination region, and notifies the image compositing unit 152. After that, the processing proceeds to step S807, and when the image compositing unit 152 composites the pre-compositing images 711 and 712 to generate the composite image 713, in the subsequent step S808, the image compositing unit 152 causes a background composite image 719 in the composite image 713 which is obtained by compositing the duplication/loss determination regions to be stored in the memory 160.

Since the background image compositing is performed based on a compositing parameter, as long as the compositing parameter does not change for composite image to be generated, the composite image will be composited at the same compositing position. The compositing parameter is, for example, a parameter for when a background image compositing was performed at the time of installation, and is held in the memory 160. In subsequent step S809, it is determined whether or not to terminate image compositing, and if image compositing is not to be terminated, the processing returns to step S801. In a case where image compositing is to be terminated, this processing is terminated. In the example of FIG. 7A, since the subject 701 moves to the position T3, the processing continues.

When step S801 is returned to, the duplication/loss determination unit 154 performs the determination once again. This time, if the subject 701 has moved to the position T3, the subject 701 is at a position on the inside of the duplication/loss determination regions 715 and 716, and therefore duplication of the subject image of the subject 701 will occur in a composite image 723 resulting in a multiple-image. The duplication/loss determination unit 154 searches in the respective duplication/loss determination regions of the captured images 711 and 712 to detect the subject images, and further detects that they are the same subject. Next, the duplication/loss determination unit 154 calculates the spatial position at which the subject 701 is present by trigonometry from the parallax information of the two images, and determines whether duplication or loss will occur. Since the subject 701 is in the space 706, the duplication/loss determination unit 154 can determine that the subject 701 will become a multiple-image.

When the duplication/loss determination unit 154 determines in step S801 that a multiple-image will occur, the processing advances to step S802. In step S802, the subject image detection unit 155 respectively extracts the subject images 731 and 732 that will result in the multiple-image, and stores shape information together with coordinate information in the memory 160. The shape information and coordinate information is information that respectively specifies a region 735 corresponding to the subject image 731 and a region 736 corresponding to the subject image 732 in the duplication/loss determination regions 715 and 716. The shape information is not necessarily information that strictly specifies the shape of the subject images 731 and 732, and may be information that specifies a circular region or a rectangular region that contains the subject image, for example. The coordinate information may be coordinate information that specifies the center position of a circular region or a rectangular region.

Furthermore, in step S803, the subject image detection unit 155 performs prioritization for the multiple-image that will occur, and for example, sets the subject image 731 to be a displayed subject image, which is the subject that will be displayed on the composite image, and the subject image 732 to be a non-displayed subject image which will not be displayed on the composite image.

In subsequent step S804, the image compositing unit 152, based on the coordinate information and shape information of the non-displayed subject image 732 held in the memory 160, extracts an image 746 corresponding to the non-displayed subject image from the background composite image 719. In subsequent step S805, the image compositing unit 152 generates the composite image 723 by compositing the pre-compositing images 721 and 722. In subsequent step S806, the image compositing unit 152 overlaps, on the composite image 723, the image 746 extracted as the image corresponding to the non-displayed subject image from the background composite image 719. It is possible to obtain the composite image 724 thereby. The image capturing apparatus 100 supplements the generated composite image with information regarding the image compositing, and distributes the image data to the client apparatus. In subsequent step S809, it is determined whether or not compositing processing is to be terminated, and in the case where it is not to be terminated, the step S801 is returned to and the processing continues. By this, it becomes possible to obtain the composite image 724 in which only the subject image 731 is displayed. By this, it becomes possible to prevent erroneous detection at a time of image analysis on the client apparatus 180.

Furthermore, in a case where the subject image 732 is set to the displayed subject image in step S803, the image compositing unit 152, based on coordinate information and shape information of the non-displayed subject image 731, extracts in step S804 from the background composite image 719 an image 745 which corresponds to the non-displayed subject image 731. Then, in step S806, a composite image 725 is obtained by overlapping the image 745 on the composite image 723. By this, it becomes possible to obtain the composite image 725 in which only the subject image 732 is displayed. By this, it becomes possible to prevent erroneous detection at a time of image analysis on the client apparatus 180.

Figure 9:
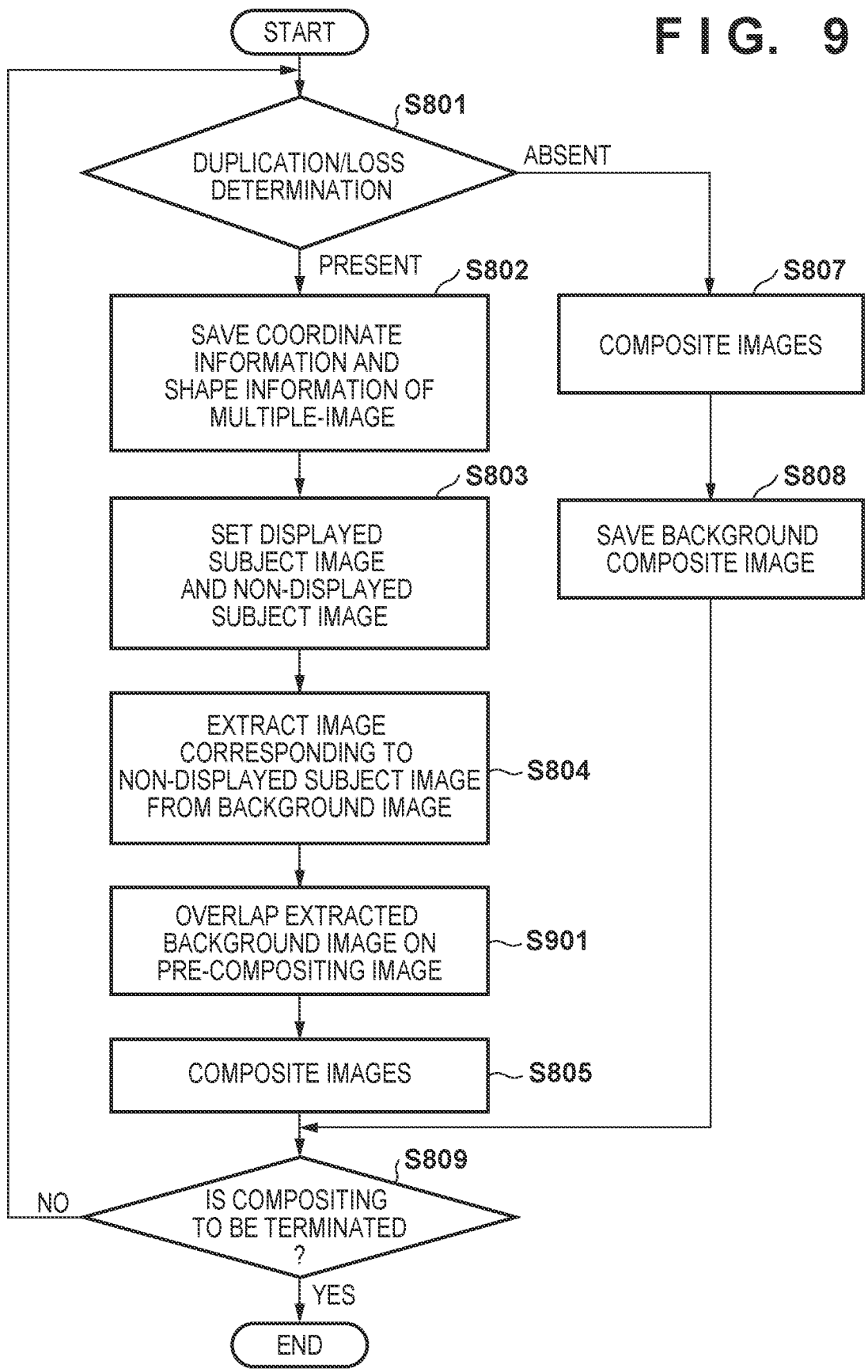
FIG. 9 is a flowchart illustrating another example of a method of generating a composite image according to the first embodiment.

In the above, description was given for a method of overlapping, onto the composite image, an image that is for causing the non-displayed subject image not to be displayed and that is extracted from the background image, but the image that is the target of the overlapping of the background image is not limited to the composite image, and the compositing order is not limited to this order. For example, it is possible to achieve a similar effect by extracting a background image, overlapping that image on the pre-compositing image, and thereafter performing image compositing in order to make the non-displayed subject image not be displayed in the composite image. A flow of compositing processing in such a case is illustrated in the flowchart of FIG. 9. In the flowchart of FIG. 9, the processing can be executed in almost the same way as in FIG. 8, but there is a difference in that the processing for overlapping the extracted background image onto the pre-compositing image is performed before the image compositing of step S805.

To explain specifically with reference to FIG. 7B, the extracted background composite image 745 is overlapped on the pre-compositing image 721 in step S901, and after that, in step S805, image compositing with the pre-compositing image 722 is performed at the compositing position 714. By this, it becomes possible to obtain the composite image 726 in which only the subject image 732 is displayed, similarly to in the processing of FIG. 8.

Also, in the description above, the image to be overlapped onto the pre-compositing image was extracted from the post-compositing background composite image 719, but in step S808, the duplication/loss determination regions 715 and 716 of the pre-compositing images may be further stored in the memory 160 as background images, and the image to be overlapped may be extracted from these images. Even in such a case, similarly to above, the composite image 726 can be obtained by extracting the image corresponding to the non-displayed subject image from the background image 715 stored in the memory 160, overlapping it onto the pre-compositing image 721, and then compositing the result with the pre-compositing image 722.

By virtue of the present embodiment above, it becomes possible to cause one of duplicative subject images in a composite image to not be displayed in an image (to be deleted, hidden, or the like), and obtain a composite image in which only a single subject image is displayed. By this, it becomes possible to prevent erroneous detection at a time of image analysis on the client apparatus 180.

Second Embodiment

In the foregoing first embodiment, description what given for a case in which duplication of a subject image occurs in a composite image, but in the present embodiment, description is given for a case in which both duplication and loss of a subject image occur.

Figure 10:
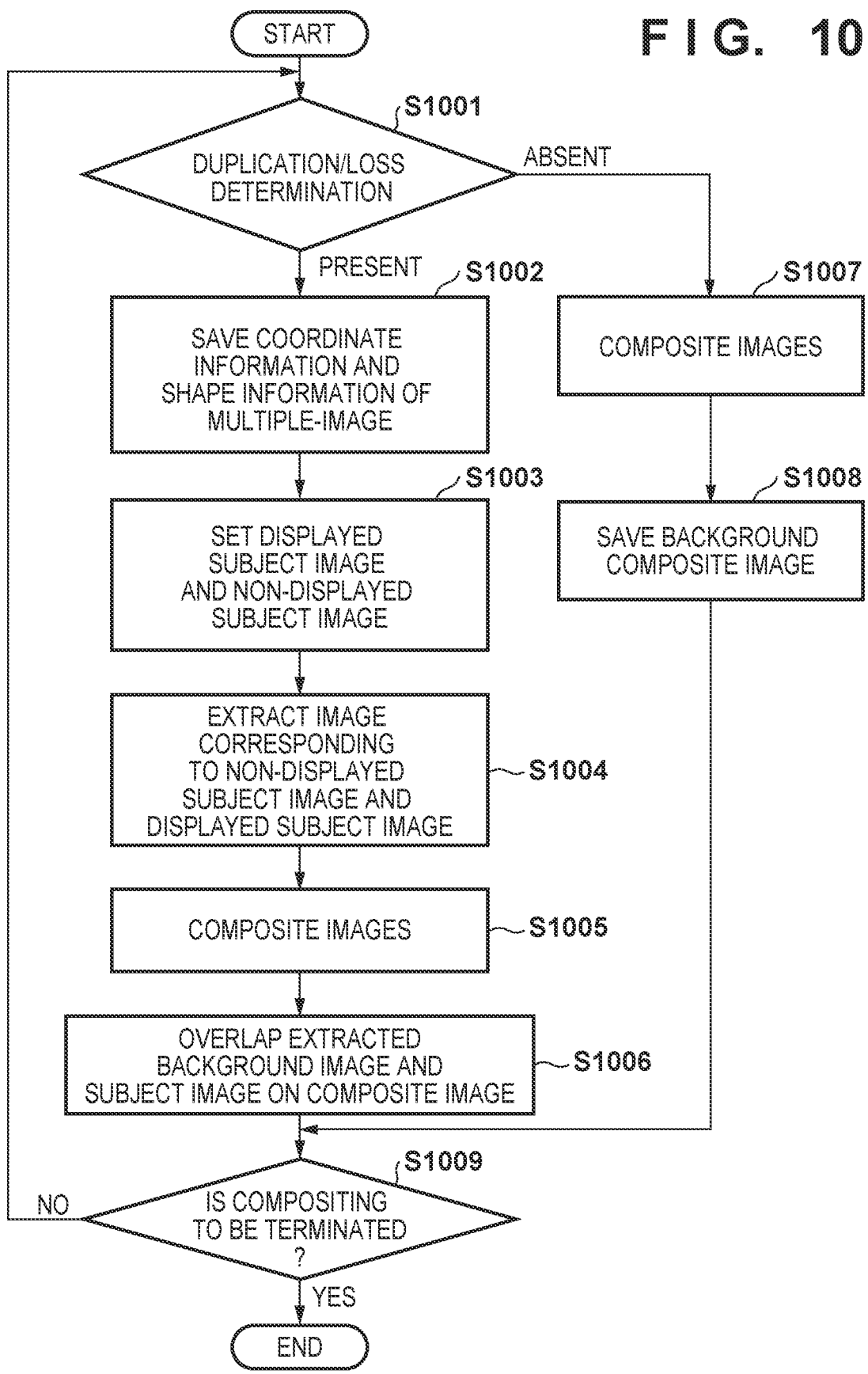
FIG. 10 is a flowchart illustrating an example of a method of generating a composite image according to a second embodiment.

The configuration of the image capturing apparatus in the present embodiment is similar to the configuration illustrated in FIG. 1A, FIG. 1B, FIG. 2A, and FIG. 2B in the first embodiment. Hereinafter, description will be given of the image compositing processing in the present embodiment with reference to FIG. 10, FIG. 11A, and FIG. 11B. FIG. 10 is a flowchart illustrating an example of image compositing processing corresponding to the present embodiment, and FIG. 11A and FIG. 11B are views for describing image compositing processing in the present embodiment.

Figure 11A:
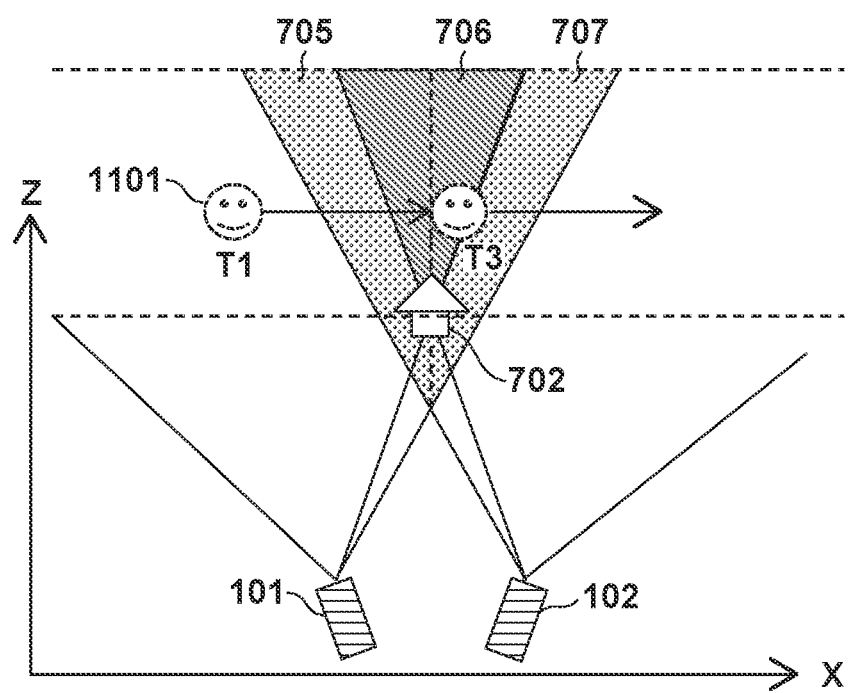
FIG. 11A is a view illustrating one example of a case in which a scene, in which a subject 1101 that moves within the image capturing angles of view of image capturing units 101 and 102 is captured, is viewed from above according to the second embodiment.

FIG. 11A, similarly to FIG. 7A, is a schematic drawing in which a scene, in which a subject 1101 that moves is being captured by the image capturing units 101 and 102, is viewed from above. The same reference numerals are given to configurations that correspond to FIG. 7A.

Figure 11B:
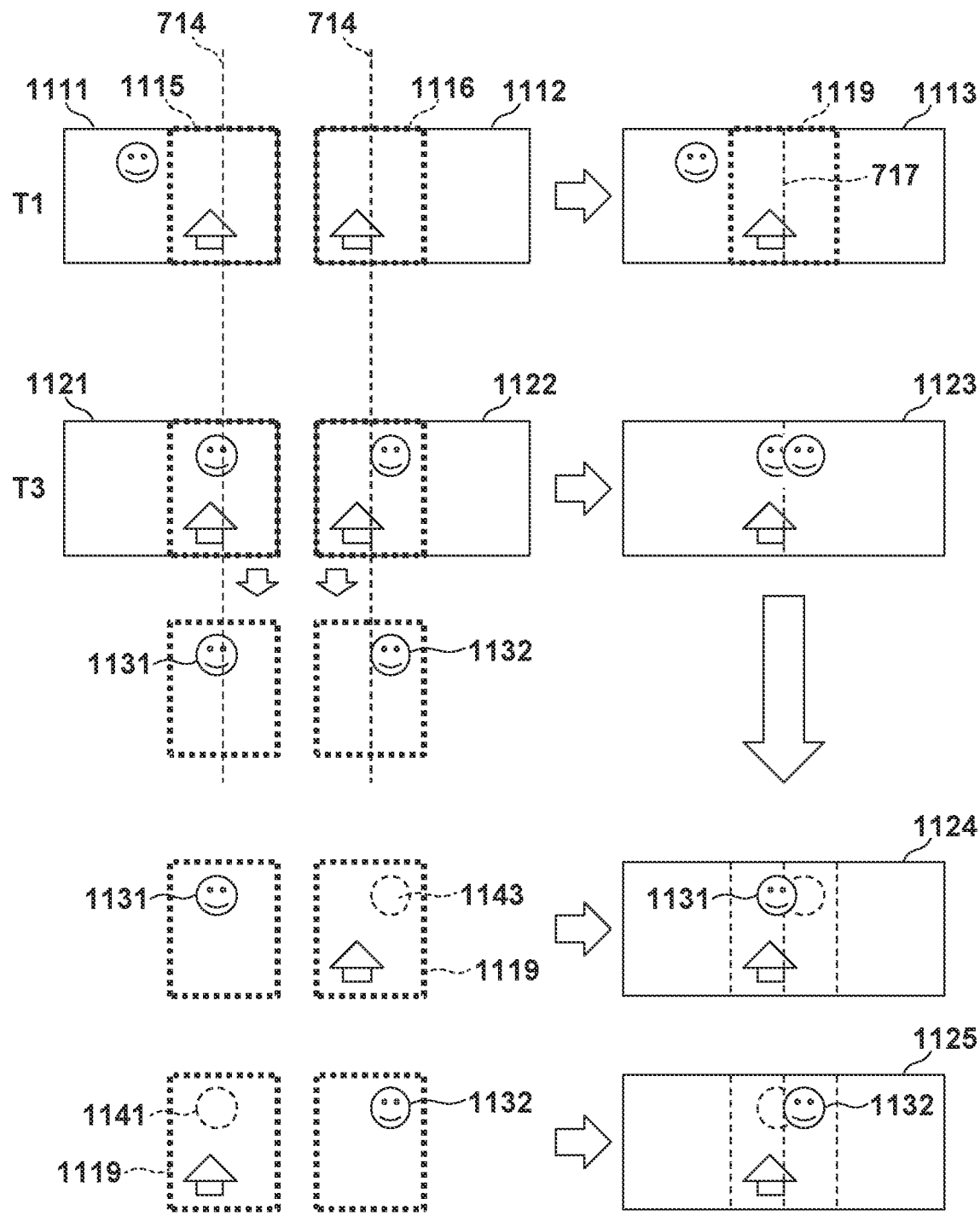
FIG. 11B is a view for describing a method of generating a composite image according to the second embodiment.

FIG. 11B illustrates captured images of FIG. 11A, and the images 1111, 1112, 1121, and 1122 are pre-compositing captured images (pre-compositing images) that are captured by the respective image capturing units, and the images 1113 and 1123 to 1125 are post-compositing captured images (composite images). Also, capture results and compositing results for the case where the position of the subject 1101 changes from the position T1 to the position T3 are illustrated. The regions 1115 and 1116 are duplication/loss determination regions set respectively in the pre-compositing images.

In step S1001, the duplication/loss determination unit 154 determines whether or not a duplication or loss will occur in the composite image. When the subject 1101 is at the position T1, the subject 1101 is outside of the duplication/loss determination regions 1115 and 1116, and duplication of the subject image of the subject 1101 will not occur in the composite image 1113. The subject image detection unit 155 detects that the subject image is not inside the duplication/loss determination region, and notifies the image compositing unit 152. After that, the processing proceeds to step S1007, and when the image compositing unit 152 composites the pre-compositing images 1111 and 1112 to generate the composite image 1113, in the subsequent step S1008, the image compositing unit 152 causes a background composite image 1119 in the composite image 1113 which is obtained by compositing the duplication/loss determination regions to be stored in the memory 160. Since the background image compositing is performed based on a compositing parameter, as long as the compositing parameter does not change for the composite image to be generated, the composite image will be composited at the same compositing position. The compositing parameter is, for example, a parameter from the background image compositing at the time of installation, and is held in the memory 160. In subsequent step S1009, it is determined whether or not to terminate image compositing, and if image compositing is not to be terminated, the processing returns to step S1001. In a case where image compositing is to be terminated, this processing is terminated. In the example of FIG. 11A, since the subject 1101 moves to the position T3, the processing continues.

The background composite image is saved in step S1008, but the background composite image used at the time of compositing can be regularly updated thereafter. Updating of the background composite image may be performed in respective partial regions. In a case where there are a plurality of subject images in a duplication/loss determination region, it is not possible to update image data of a region in which a subject image is present. Accordingly, in a case of a region in which there is no subject image and an evaluation value of the current image has changed by a fixed amount or more from a region of the same coordinates of the previously saved background composite image, it is possible to perform a partial update.

Also, regarding updating of the background composite image, the image compositing unit 152 can evaluate a difference of a background composite image that is held in a memory from a background image region on a composite image that was currently composited, and thereby calculate an evaluation value. The calculation of the evaluation value is performed for each region into which the background composite image is divided, and in a case where the calculated evaluation value is a predetermined evaluation value or greater, the background composite image held in the memory is updated. For example, configuration may be taken to detect whether a background image region color or luminance value or contrast value difference is greater than or equal to a threshold. Also, configuration may be taken to not only compare image data, but also use time information for a time of compositing as the evaluation value. Configuration may be taken to detect that a predetermined amount of time has elapsed since the previous background compositing, and to update the background image.

When step S1001 is returned to, the duplication/loss determination unit 154 performs the determination once again. This time, if the subject 1101 has moved to the position T3, the subject 1101 is at a position on the inside of the duplication/loss determination regions 1115 and 1116, and therefore duplication of the subject image of the subject 1101 will occur in a composite image 1123. The duplication/loss determination unit 154 searches in the respective duplication/loss determination regions of the captured images 1121 and 1122 to detect the subject images, and further detects that the detected subject images are the same subject. Next, the duplication/loss determination unit 154 calculates the spatial position at which the subject 1101 is present from the coordinates of the two images, and determines whether duplication or loss occurs. Since the subject 1101 is in the space 706, the duplication/loss determination unit can determine that the subject 1101 will become a multiple-image.

In step S1001, when the duplication/loss determination unit 154 determines that a multiple-image will occur, the processing advances to step S1002. In step S1002, the subject image detection unit 155 respectively extracts the subject images 1131 and 1132 that will result in the multiple-image, and stores shape information together with coordinate information in the memory 160. Furthermore, in step S1003, the subject image detection unit 155 performs prioritization of multiple-images that will occur, and for example, sets the subject image 1131 to be a displayed subject image, which is the subject that will be displayed on the composite image, and the subject image 1132 to be a non-displayed subject image which will not be displayed on the composite image.

The selection of the displayed subject image can be performed based on priority order information from the client apparatus 180. For example, in a case where four images are composited as in FIG. 3B, the image closest to the center of the display of the composite image may be prioritized and made to be the displayed subject. Also, for example, in a case where an image analysis region is set in the client apparatus 180, configuration may be taken to select the subject image closest to the image analysis region as the displayed subject. Also, configuration may be taken to, in a case where a part of a subject image is lost in a composite image, set the subject image with the larger display area to be the displayed subject, for example, in accordance with the extent of the loss. Alternatively, configuration may be taken such that in a case where the target subject image is a person, a subject image in which an important body part such as the face is included is set as the displayed subject.

In subsequent step S1004, the image compositing unit 152, based on the coordinate information and shape information of the non-displayed subject image 1132 held in the memory 160, extracts an image 1143 corresponding to the non-displayed subject image from the background composite image 1119. Also, the image 1131 corresponding to the displayed subject image is extracted from the duplication/loss determination region 1115 based on the coordinate information and the shape information of the displayed subject image 1131 held in the memory 160. In subsequent step S1005, the image compositing unit 152 generates the composite image 1123 by compositing the pre-compositing images 1121 and 1122. Furthermore, in subsequent step S1006, the image compositing unit 152 overlaps, on the composite image 1123, the image 1143 extracted as the image corresponding to the non-displayed subject image from the background composite image 1119 and the subject image 1131 extracted from the duplication/loss determination region 1115.

By this, the non-displayed subject image 1132 ceases to be displayed on a composite image 1124, and the displayed subject image 1131 is displayed in a complete form. The image capturing apparatus 100 supplements the generated composite image with information regarding the image compositing, and distributes the image data to the client apparatus. In subsequent step S1009, it is determined whether or not compositing processing is to be terminated, and in the case where it is not to be terminated, the step S1001 is returned to and the processing continues.

By the above, it becomes possible to obtain the composite image 1124 in which only the subject image 1131 is displayed. By this, it becomes possible to prevent erroneous detection at a time of image analysis on the client apparatus 180.

By the above, the subject image 1131 is made to be the displayed subject image and the subject image 1132 is set to be the non-displayed subject image, but in the case where the subject image 1132 is set to be the displayed subject image, a background image 1141 corresponding to the non-displayed subject image 1131 is extracted from the background composite image 1119 in step S1004, and overlapped on the composite image 1123 in step S1006. Also, in step S1004, the displayed subject image 1132 is extracted, and the displayed subject image 1132 is also overlapped on the composite image in step S1006, and thereby the composite image 1125 is obtained.

Furthermore, in a case where loss of a subject image occurs in the composite image illustrated in FIG. 11B, configuration may be such that compositing processing is performed after making the subject image for which the loss occurs be not displayed in the pre-compositing image. In FIG. 11B, a loss occurs for the subject image 1131 in the composite image 1123 at the position T3. Accordingly, in accordance with the flowchart of FIG. 9, in step S803, the subject image 1131 is set to be the non-displayed subject, and the subject image 1131 can be cleared from the pre-compositing image 1121 by overlapping the extracted background image 1141 on the pre-compositing image 1121 in step S901. After that, the composite image 1125 can be obtained by performing the image compositing in step S805. By the above, it becomes possible to obtain the composite image 1125 in which only the subject image 1132 is displayed. By this, it becomes possible to prevent erroneous detection at a time of image analysis on the client apparatus 180.

In the above, a case in which two images are composited is described, but it is possible to similarly prevent the occurrence of a multiple-image in a case where three or more images are composited. Also, the number of multiple-images that occur may be plural. In a case where there are a plurality of subject images for which a multiple-image will occur, the duplication/loss determination unit 154 determines the distances of the subjects from the image capturing apparatus 100, and overlaps the subjects onto the composite image in order from furthest to nearest. By this, it is possible to prevent duplication of subject images while preserving the in front/behind relationship of the subject images.

In the above, description is given for a method of preventing the occurrence of duplication of subject images by selected a duplicative subject and overlapping a background image thereon. By this, it becomes possible to prevent erroneous detection at a time of image analysis on the client apparatus 180.

Third Embodiment

In the present embodiment, description is given for image compositing processing in a case where there is a subject whose subject image is in front of a subject that is a reference for compositing a background image. As described with reference to FIG. 5A, there is the possibility that a loss will occur for an image in front of the subject that is the compositing position reference. In the image compositing processing corresponding to the present embodiment, prevention of loss of a subject image in such a composite image is enabled.

Figure 12B:
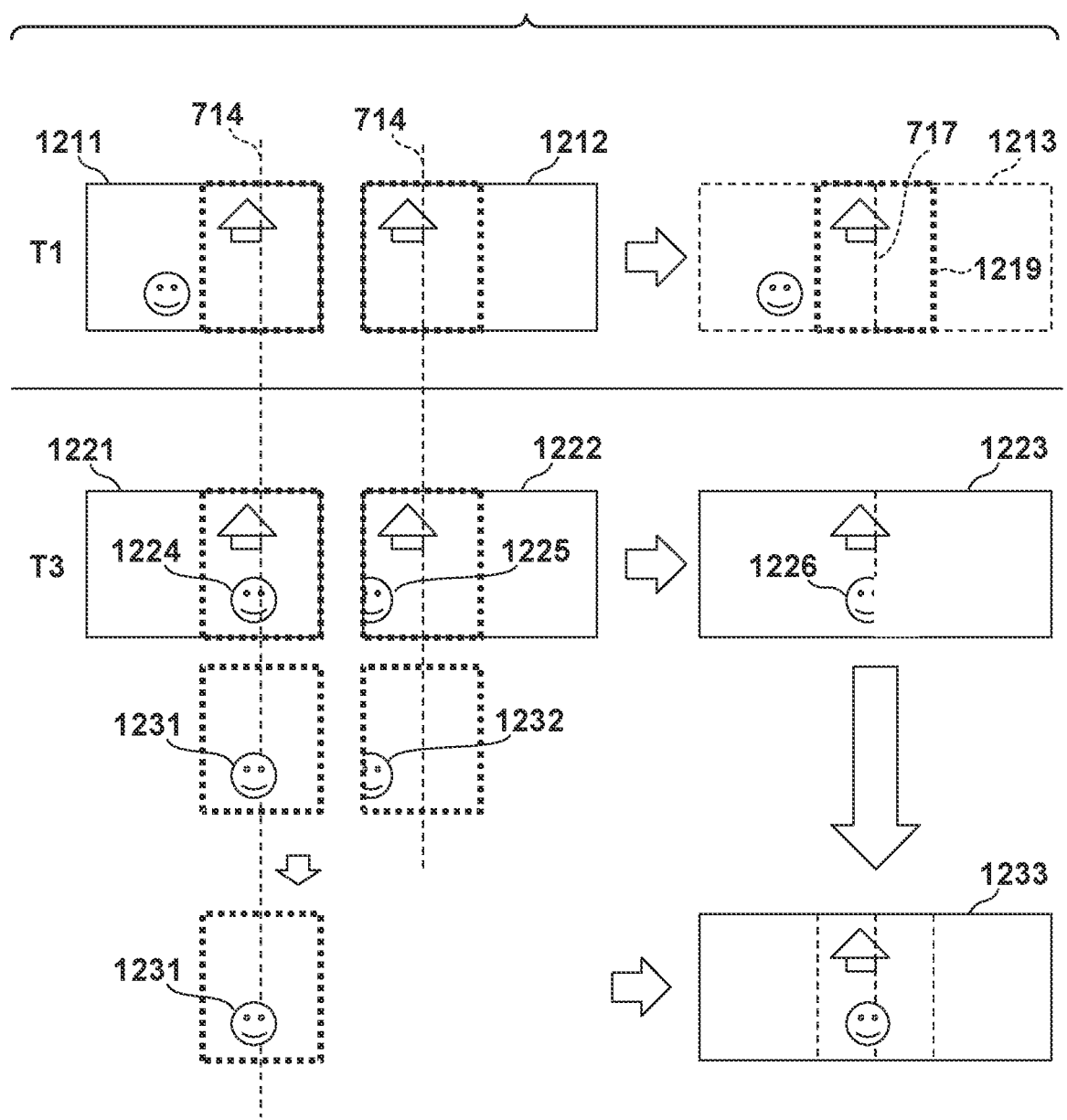
FIG. 12B is a view for describing a method of generating a composite image according to the third embodiment.

The configuration of the image capturing apparatus in the present embodiment is similar to the configuration illustrated in FIG. 1A, FIG. 1B, FIG. 2A, and FIG. 2B in the first embodiment. Hereinafter, description will be given of image compositing processing in the present embodiment with reference to FIG. 12A and FIG. 12B. FIG. 12A and FIG. 12B are views for describing image compositing processing in the present embodiment.

FIG. 12A, similarly to FIG. 7A, is a schematic drawing in which a scene, in which the subject 1201 that moves is being captured by the image capturing units 101 and 102, is viewed from above. The same reference numerals are given to configurations that correspond to FIG. 7A. In FIG. 12A, the subject 1201 is moving from the position T1 to the position T3 at a shorter distance to the image capturing apparatus 100 than the fixed subject 702 which is the reference for the background composite image.

FIG. 12B is a schematic drawing illustrating image compositing processing in which the image capturing units 101 and 102 have captured the subject 1201 with the arrangement of FIG. 12A. Images 1211, 1212, 1221, and 1222 are pre-compositing captured images (pre-compositing images) that were captured by the image capturing units 101 and 102, and images 1213 and 1223 are post-compositing captured images (composite images). Because image compositing is performed by performing positional alignment by the subject 702 which is the reference for the background composite image, part of the image of the subject image 1226 is lost in the composite image 1223. Also, the subject image 1226 corresponds to a subject image 1224 of a pre-compositing image 1221, but the subject image of a subject image 1225 of the pre-compositing image 1222 is not included in the corresponding composite image 1223. This is because the subject image 1225 exists only in an image region that is deleted due to the compositing processing.

The flow of image compositing processing in the present embodiment is similar to FIG. 10. In step S1001, the duplication/loss determination unit 154 determines whether or not a duplication or loss will occur in the composite image. When the subject 1201 is at the position T1, it is outside of the duplication/loss determination region, and therefore no duplication of the subject 1201 occurs in the composite image. The processing proceeds to step S1007, and when the image compositing unit 152 composites the pre-compositing images 1211 and 1212 to generate the composite image 1213, in the subsequent step S1008, the image compositing unit 152 causes a subject image background composite image 1219 in the composite image 1213 which is obtained by compositing the duplication/loss determination regions to be stored in the memory 160. In subsequent step S1009, it is determined whether or not to terminate image compositing, and if image compositing is not to be terminated, the processing returns to step S1001. In a case where image compositing is to be terminated, this processing is terminated. In the example of FIG. 12A, since the subject 1201 moves to the position T3, the processing continues.

Step S1001 is returned to, and when the subject 1201 moves and enters the duplication/loss determination region, the subject 1201 is detected as a subject image. Furthermore, it is determined that the same subject is detected as a subject image in both the captured images 1221 and 1222, but since it can be seen from calculation of the subject position that the subject is not present in the multiple-image region 706 of FIG. 12A, it is determined that a multiple-image will not occur. Next, the duplication/loss determination unit 154 determines that the subject images 1224 and 1225 are present at positions that straddle the image compositing position 714. When the subject 1201 is at the position T3, it is determined that there will be a loss after compositing for the subject image 1224 since it straddles the compositing position. Since it is determined that the subject image 1225 does not straddle the compositing position and is positioned outside of the compositing position 714, it determined that an image of the subject image 1225 will not be in the composite image 1223.

When it is determined in step S1001 that there is a loss, the processing proceeds to step S1002, and the subject image detection unit 155 extracts the subject images 1231 and 1232 from the captured images 1221 and 1222, and stores shape information together with coordinate information in the memory 160. Furthermore, in step S1003, the subject image detection unit 155 sets the subject image 1231 to be the displayed subject image and the subject image 1232 to be the non-displayed subject image. In subsequent step S1004, the image compositing unit 152, based on the coordinate information and shape information of the displayed subject image 1231 held in the memory 160, extracts the image 1231 corresponding to the displayed subject image from the duplication/loss determination region. In subsequent step S1005, the image compositing unit 152 generates the composite image 1223 by compositing the pre-compositing images 1221 and 1222. Also, in subsequent step S1006, the image compositing unit 152 obtains a composite image 1233 by overlapping the subject image 1231 at the coordinates of the displayed subject image of the composite image 1223.

As described above, it becomes possible to determine that a loss of a subject will occur and to prevent the loss of the subject image by selecting the subject and overlapping the subject onto the background image.

Fourth Embodiment

In the present embodiment, description will be given for a method of selecting a displayed subject in a case where a subject image crosses two or more images to be composited. The configuration of the image capturing apparatus in the present embodiment is similar to the configuration illustrated in FIG. 1A, FIG. 1B, FIG. 2A, and FIG. 2B in the first embodiment.

Figure 13A:
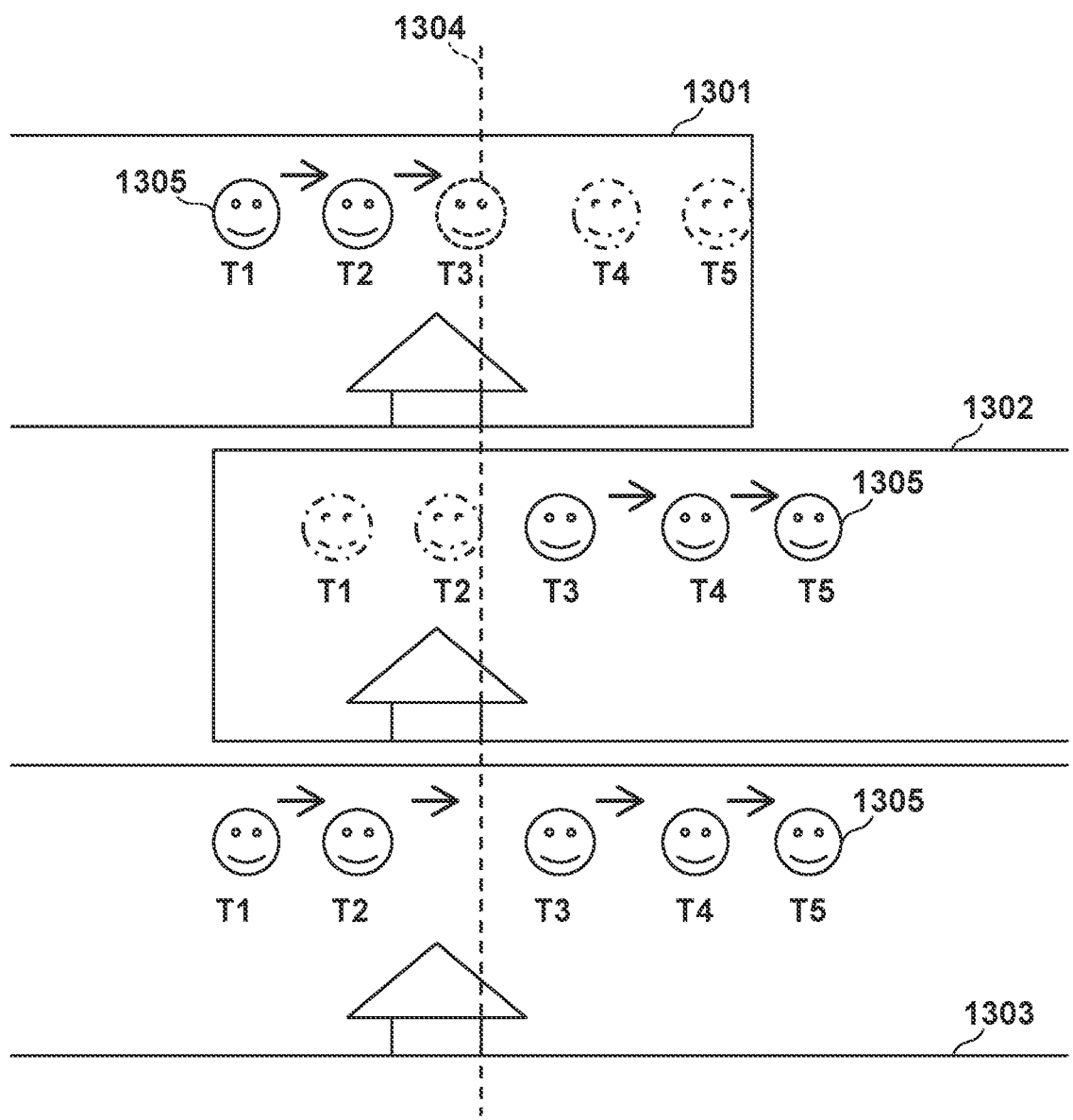
FIG. 13A is a view for describing one example of a method of selecting a displayed subject according to a fourth embodiment.
Figure 13B:
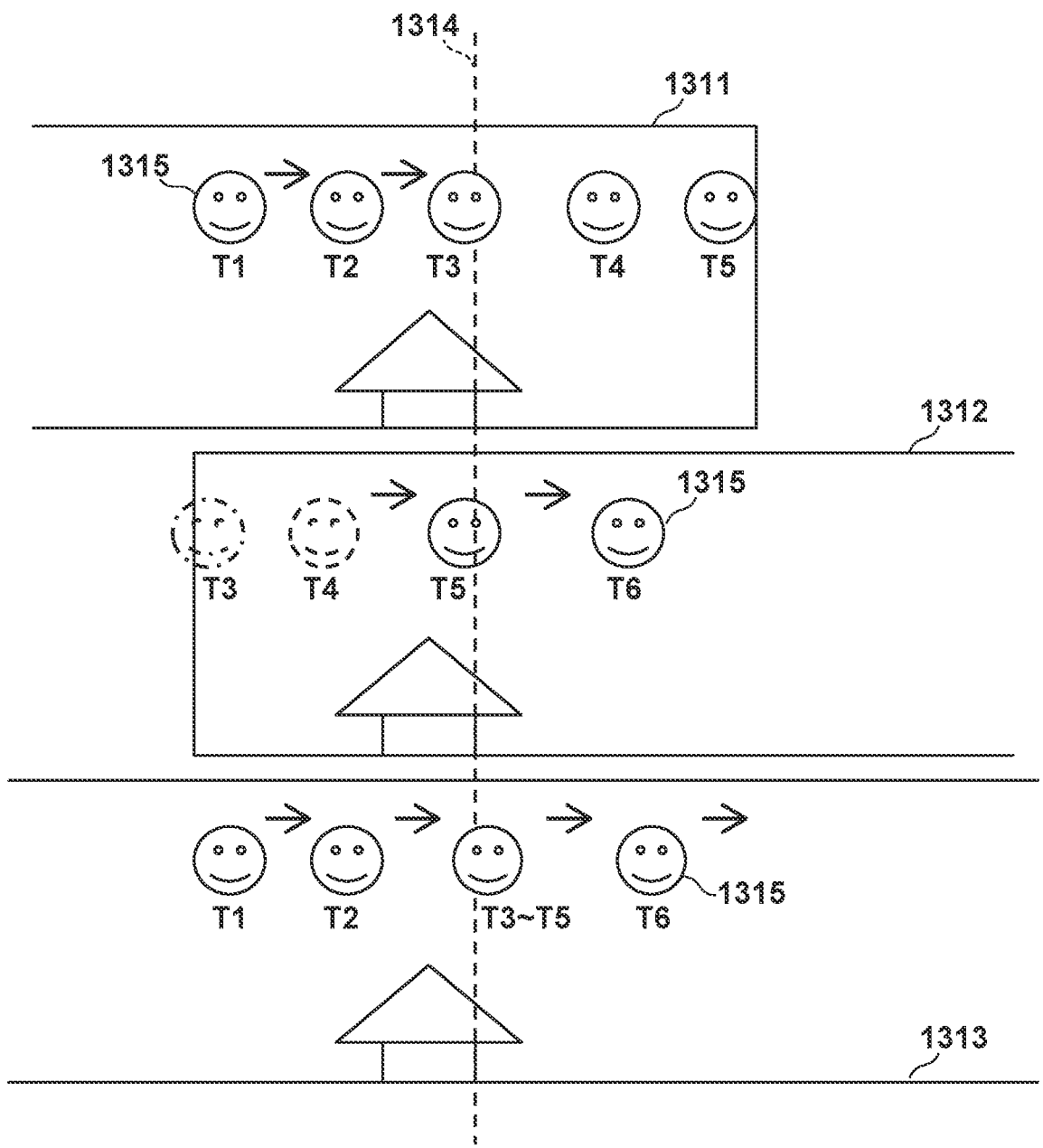
FIG. 13B is a view for describing another example of a method of selecting a displayed subject according to a fourth embodiment.

FIG. 13A and FIG. 13B are views for describing a method of selecting a displayed subject corresponding to the present embodiment. FIG. 13A illustrates pre-compositing images and composite images in the case where the subject 1101 which is the target of subject image selection is to the rear of image capturing angles of view in relation to the reference subject 702 by which the background image is composited, as illustrated in FIG. 11A. FIG. 13B illustrates pre-compositing images and composite images in the case where the subject 1201 which is the target of selection is to the front of image capturing angles of view in relation to the reference subject 702 by which the background image is composited, as illustrated in FIG. 12A. In the present embodiment, description is given for a method of switching the displayed subject image and the non-displayed subject image so that display of the subject image on the composite image will not be discontinuous in a case where the subject image is moving in a fixed direction and it is determined that a multiple-image will occur.

FIG. 13A illustrates a case in which pre-compositing images 1301 and 1302 are composited and a composite image 1303 is obtained. A dashed line 1304 indicates a compositing position, and a subject image 1305 is moving in the vicinity of a compositing position 1304. The subject image 1305 moves from left to right in the pre-compositing images 1301 and further moves in a rightward direction in pre-compositing images 1302. In the pre-compositing images 1301 and 1302, the position at which the subject image 1305 is shown is the position of the subject image at the points in time T1 to T5 respectively. Since there is parallax due to the arrangement positions of the image capturing units 101 and 102, even though the time is the same, the positions at which the subject image 1305 is displayed differ between the captured image 1301 and the captured images 1302. For example, at the time T3, the subject image 1305 is positioned at the compositing position 1304 in the pre-compositing image 1301, but has already passed the compositing position 1304 in the pre-compositing image 1302.

The subject image 1305, in the composite image 1303, moves across the image boundary corresponding to the compositing position 1304. At that time, the part to the left of the compositing position 1304 of the composite image 1303 corresponds to the pre-compositing image 1301, and the part to the right of the compositing position 1304 corresponds to the pre-compositing image 1302. In the present embodiment, the displayed subject image to be displayed on the composite image and the non-displayed subject image that is not to be displayed on the composite image are switched based on this compositing position 1304. Specifically, when the image compositing unit 152 detects that the subject image 1305 has reached the compositing position 1304 in the pre-compositing image 1301, the subject image 1305 of the pre-compositing image 1302 is switched to be the displayed subject image. Thereby, the subject image 1305 to be composited on the composite image 1303 is the subject image of the pre-compositing image 1301 at times T1 and T2, and is the subject image of the pre-compositing image 1302 from the time T3. Here, the position at which the subject image is switched is made to be the compositing position 1304, but limitation is not made to this, and it is possible to set any position as appropriate on the image overlap region.

By the above, the subject having moved from the left side of the captured image moves in order from positions of T1 to T5, and the movement of the subject image 1305 displayed on the composite image 1303 is motion that is not unnatural.

FIG. 13B illustrates a case in which pre-compositing images 1311 and 1312 are composited and a composite image 1313 is obtained. A dashed line 1314 indicates a compositing position, and a subject image 1315 is moving in the vicinity of a compositing position 1314. The subject image 1315 moves from left to right in the pre-compositing images 1311 and further moves in a rightward direction in pre-compositing images 1312. In the pre-compositing images 1311 and 1312, the position at which the subject image 1315 is shown is the position of the subject image at the points in time T1 to T5 respectively. The subject image 1315, in the composite image 1313, moves across the image boundary corresponding to the compositing position 1314. However, since the subject 1201 moves to a position closer to the image capturing apparatus than the reference subject 702 of the compositing position, as illustrated in FIG. 12A, the positions in the two pre-compositing images are misaligned. The compositing position 1314 is straddled at the time T3 in the pre-compositing image 1311, but the compositing position 1314 is straddled at the time T5 in the pre-compositing image 1312. Accordingly, at the time T4 when switching is performed based on the compositing position 1314, the subject image 1315 temporarily disappears on the composite image even though it is on the pre-compositing images.

Accordingly, in a case of a subject that crosses two images, the subject image on the image before movement is extracted, its coordinates are changed, and it is overlapped on the composite image. Here, as one example, the x-coordinate of the subject image is fixed to the compositing position 1314, and only they coordinate of the subject image is changed in accordance with the movement of the subject image. For example, when the image compositing unit 152 detects that the subject image 1315 in the pre-compositing image 1311 spans the compositing position 1314, it extracts the subject image 1315 in the duplication/loss determination region, and holds it in the memory 160. The image compositing unit 152 changes the coordinate information of the subject image held in the memory 160, and overlaps the subject image at the compositing position 1314 of the composite image 1313.

Next, when it is detected that the subject image 1315 has reached the compositing position 1314 on the pre-compositing image 1312, the subject image to be displayed on the compositing position 1314 is switched to the subject image 1315 of the pre-compositing image 1312. Thereby, the subject image to be composited on the composite image 1313 is the subject image of the pre-compositing image 1311 at times T1 to T5, and is the subject image of the pre-compositing image 1312 from the time T6.

The appearance of the subject image moving over the composite image 1313 is that the subject 1201 is displayed as the subject image that moves at times T1 to T3, and stops at the compositing position 1314 during the times T3 to T5, and then moves again from the time T6.

In addition, the coordinate of the subject image that is fixed, may be changed depending on how the compositing position 1314 is taken. Here a case in which left and right images are composited was described, but in the case of composite top and bottom images, for example, configuration may be taken so that the y coordinate of the displayed subject image is fixed and the x-coordinate is changed.

By the above, even if the subject moves across the compositing position, it is possible to display the subject image consecutively moving on the composite image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094758 filed on May 16, 2018 which is hereby incorporated by reference herein in its entirety.

What is claimed is:

1. An image capturing apparatus, comprising a first and a second image capturing units wherein the first and the second image capturing units arranged so that a part of an image capturing angle of view overlaps each other, the apparatus comprising:
   a compositing unit configured to generate a composite image by performing compositing processing for combining images captured by each of the first and the second image capturing units,
   wherein the compositing unit, in a case where a first subject image and a second subject image, which are subject images of the same subject, are included duplicatively in the composite image, makes the second subject image not be displayed in the composite image by using a background image corresponding to a position of the second subject image.

2. The image capturing apparatus according to claim 1, wherein the compositing unit makes the second subject image not be displayed in the composite image by overlapping the background image corresponding to the position of the second subject image onto the composite image.

3. The image capturing apparatus according to claim 1, wherein the compositing unit overlaps the background image corresponding to the position of the second subject image onto one of the captured images that includes the second subject image, and makes the second subject image not be displayed in the composite image by performing the compositing processing by using the image onto which the background image was overlapped.

4. The image capturing apparatus according to claim 1, wherein the compositing unit sets a first region in which a subject image may be included duplicatively in the composite image, and makes the second subject image not be displayed in the composite image by using an image corresponding to the position of the second subject image and obtained from the background image, and
   wherein the background image is an image of the first region in a composite image in which a subject image is not included in the first region.

5. The image capturing apparatus according to claim 1, wherein the compositing unit, in a case where the first subject image is included in the composite image with a loss, further overlaps a subject image that does not have a loss and is obtained from one of the captured images that includes the subject image onto the composite image.

6. The image capturing apparatus according to claim 1, wherein the compositing unit, in the case where subject images of the same subject are included in duplicatively in the composite image, determines the first subject image and the second subject image in accordance with an extent of loss or positions of the respective subject images in the composite image.

7. The image capturing apparatus according to claim 6, wherein the compositing unit makes the subject image whose extent of loss is smaller be the first subject image.

8. The image capturing apparatus according to claim 1, wherein the compositing unit, in a case where subject images of the same subject move across a boundary of the images combined in the composite image, switches the first subject image and the second subject image based on the boundary.

9. The image capturing apparatus according to claim 8, wherein the boundary of the image is a boundary at which the captured first image and second image are combined, and
   wherein in a case where the subject image moves across the boundary, from a first part in which the first image is included to a second part in which the second image is included in the composite image,
   the compositing unit, in a case where the subject image is included in the first image corresponding to the first part, determines the subject image in the first image to be the first subject image, and in a case where the subject image is included in the second image corresponding to the second part, determines the subject image in the second image to be the first subject image.

10. The image capturing apparatus according to claim 9, wherein the compositing unit, while the subject image is included in the first image corresponding to the first part, determines the subject image in the first image to be the first subject image.

11. The image capturing apparatus according to claim 9, wherein even if the subject image ceases to be included in the first image corresponding to the first part, in a case where the subject image is not included in the second image corresponding to the second part, the compositing unit determines a subject image in the first image to be the first subject image and overlaps the subject image onto the composite image at a position of the boundary.

12. A method of controlling an image capturing apparatus comprising a first and a second image capturing units that are arranged so that a part of an image capturing angle of view overlaps each other, the method comprising:
   the first and the second image capturing units generating an image by performing image capturing; and
   generating a composite image by performing compositing processing for combining images captured by each of the first and the second image capturing units,
   wherein in the generating of the composite image, in a case where a first subject image and a second subject image, which are subject images of the same subject, are included duplicatively in the composite image, the second subject image is made to not be displayed in the composite image by using a background image corresponding to a position of the second subject image.

13. A non-transitory computer-readable storage medium storing one or more programs including instructions that, when executed by a processor of an image capturing apparatus comprising a first and a second image capturing units that are arranged so that a part of an image capturing angle of view overlaps each other, cause the processor to perform operations of:
   causing each of the first and the second image capturing units to generate an image by performing image capturing; and
   generating a composite image by performing compositing processing for combining images captured by each of the first and the second image capturing units,
   wherein in the generating of the composite image, in a case where a first subject image and a second subject image, which are subject images of the same subject, are included duplicatively in the composite image, the second subject image is made to not be displayed in the composite image by using a background image corresponding to a position of the second subject image.

* * * * *